US012785901B2

(12) United States Patent
Lee et al.

(10) Patent No.: US 12,785,901 B2
(45) Date of Patent: Nov. 3, 2026

(54) METHOD AND DEVICE FOR TRANSMITTING OR RECEIVING HARQ FEEDBACK IN NR V2X

(71) Applicant: LG ELECTRONICS INC., Seoul (KR)

(72) Inventors: Seungmin Lee, Seoul (KR); Hanbyul Seo, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 860 days.

(21) Appl. No.: 17/767,377

(22) PCT Filed: Oct. 7, 2020

(86) PCT No.: PCT/KR2020/013608

§ 371 (c)(1),
(2) Date: Dec. 18, 2023

(87) PCT Pub. No.: WO2021/071216

PCT Pub. Date: Apr. 15, 2021

(65) Prior Publication Data

US 2025/0055646 A1 Feb. 13, 2025

Related U.S. Application Data

(60) Provisional application No. 62/925,194, filed on Oct. 23, 2019, provisional application No. 62/923,455,
(Continued)

(51) Int. Cl.
*H04L 5/00* (2006.01)

(52) U.S. Cl.
CPC .......... *H04L 5/0055* (2013.01); *H04L 5/0048* (2013.01)

(58) Field of Classification Search
CPC ....... H04L 5/0055; H04L 5/0048; H04L 1/18; H04L 5/00; H04L 5/0051; H04L 5/0053;
(Continued)

(56) References Cited

U.S. PATENT DOCUMENTS 10,219,291 B2 2/2019 Pelletier et al.
2019/0052436 A1 2/2019 Desai et al.
(Continued)

FOREIGN PATENT DOCUMENTS

WO 2015-122629 A1 8/2015
WO 2018-201448 A1 11/2018

OTHER PUBLICATIONS

Huawei, HiSilicon Design and contents of PSCCH and PSFCH 3GPP TSG RAN WG1 Meeting #96 R1-1903071 Athens, Greece, Feb. 25-Mar. 1, 2019 (Year: 2019).*
(Continued)

*Primary Examiner* — Nicholas A Jensen
*Assistant Examiner* — Ayodele Lawrence Olubodun
(74) *Attorney, Agent, or Firm* — Bryan Cave Leighton Paisner LLP

(57) ABSTRACT

A method for performing radio communication by a first device, and a device for supporting same may be provided. The method may comprise the steps of: receiving a physical sidelink control channel (PSCCH) from a second device; receiving a physical sidelink shared channel (PSSCH) related to the PSCCH from the second device; determining a physical sidelink feedback channel (PSFCH) resource related to the PSSCH, on the basis of an index of a slot related to the PSSCH and an index of a sub-channel related to the PSSCH; and transmitting, to the second device, hybrid automatic repeat request (HARQ) feedback information for the PSSCH on the PSFCH resource.

8 Claims, 26 Drawing Sheets

Related U.S. Application Data filed on Oct. 18, 2019, provisional application No. 62/912,012, filed on Oct. 7, 2019.

(58) Field of Classification Search
CPC ...... H04L 5/0094; H04W 4/40; H04W 72/04; H04W 72/12
See application file for complete search history.

(56) References Cited

U.S. PATENT DOCUMENTS

| | | | | |
|---|---|---|---|---|
| 2020/0029318 | A1* | 1/2020 | Guo | H04L 1/1819 |
| 2020/0344722 | A1* | 10/2020 | He | H04L 5/0055 |
| 2021/0007096 | A1* | 1/2021 | Huang | H04L 1/1887 |
| 2021/0014831 | A1* | 1/2021 | Ryu | H04L 5/0092 |
| 2022/0110076 | A1* | 4/2022 | Shimoda | H04W 56/0015 |
| 2022/0346118 | A1* | 10/2022 | Wu | H04L 1/1819 |
| 2022/0407634 | A1* | 12/2022 | Ryu | H04W 72/0453 |

OTHER PUBLICATIONS

Huawei et al., "Design and contents of PSCCH and PSFCH", R1-1903071, 3GPP TSG RAN WG1 Meeting #96, Athens, Greece, Feb. 15, 2019, Section 3.3 and Figures 5-6.

* cited by examiner (a)

(b)

METHOD AND DEVICE FOR TRANSMITTING OR RECEIVING HARQ FEEDBACK IN NR V2X

This application is the National Stage filing under 35 U.S.C. 371 of International Application No. PCT/KR2020/013608 filed on Oct. 7, 2020, which claims priority to U.S. Provisional Application Nos. 62/912,012, filed on Oct. 7, 2019; 62/923,455, filed on Oct. 18, 2019 and 62/925,194, filed on Oct. 23, 2019, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, a transmitting UE may transmit a PSSCH to a receiving UE, and a receiving UE may transmit a PSFCH for a PSSCH to a transmitting UE. In this case, the minimum time gap between the PSSCH and the PSFCH needs to be configured for a UE.

Technical Solutions

In one embodiment, a method for performing, by a first apparatus, wireless communication may be proposed. The method may comprise: receiving a physical sidelink control channel (PSCCH) from a second apparatus; receiving a physical sidelink shared channel (PSSCH) related to the PSCCH from the second apparatus; determining a physical sidelink feedback channel (PSFCH) resource related to the PSSCH, based on an index of a slot related to the PSSCH and an index of a subchannel related to the PSSCH; and transmitting hybrid automatic repeat request (HARQ) feedback information for the PSSCH to the second apparatus on the PSFCH resource. Here, the PSSCH may be received on a first slot which is the Nth slot, the HARQ feedback information may be transmitted on a second slot which includes the PSFCH resource, among the N+Kth slot and slots after the N+Kth slot, the N value and the K value may be zero or positive integers, and the K value may be configured based on at least one of a PSCCH resource, a PSSCH resource, or the PSFCH resource, configured for a resource pool.

In one embodiment, a first apparatus for performing wireless communication may be proposed. The first apparatus may comprise: one or more memories storing instructions; one or more transceivers; and one or more processors connected to the one or more memories and the one or more transceivers, wherein the one or more processors execute the instructions to: receive a physical sidelink control channel (PSCCH) from a second apparatus; receive a physical sidelink shared channel (PSSCH) related to the PSCCH from the second apparatus; determine a physical sidelink feedback channel (PSFCH) resource related to the PSSCH, based on an index of a slot related to the PSSCH and an index of a subchannel related to the PSSCH; and transmit hybrid automatic repeat request (HARQ) feedback information for the PSSCH to the second apparatus on the PSFCH resource. Here, the PSSCH may be received on a first slot which is the Nth slot, the HARQ feedback information may be transmitted on a second slot which includes the PSFCH resource, among the N+Kth slot and slots after the N+Kth slot, the N value and the K value may be zero or positive integers, and the K value may be configured based on at least one of a PSCCH resource, a PSSCH resource, or the PSFCH resource, configured for a resource pool.

Effects of the Disclosure

The user equipment (UE) may efficiently perform SL communication.

DESCRIPTION OF EXEMPLARY EMBODIMENTS

Figure 1:
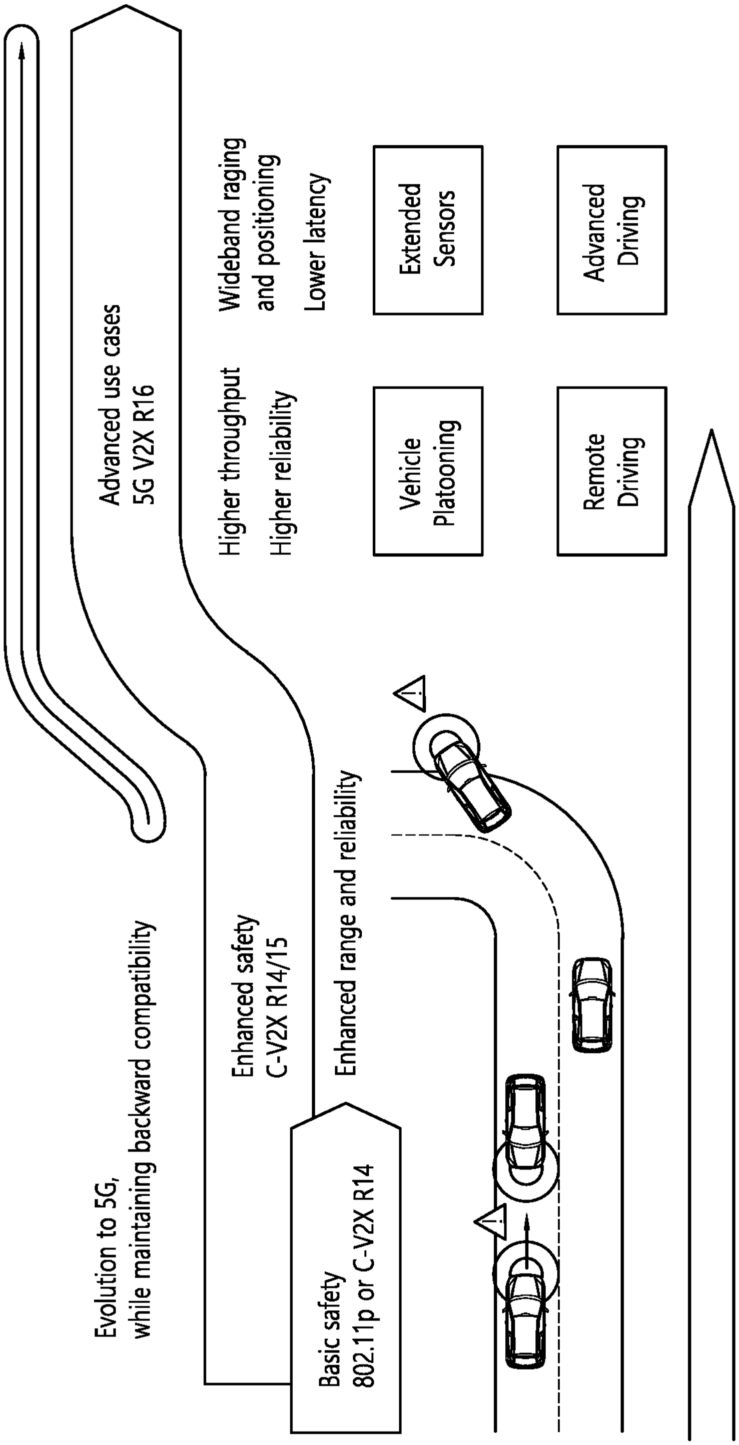
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
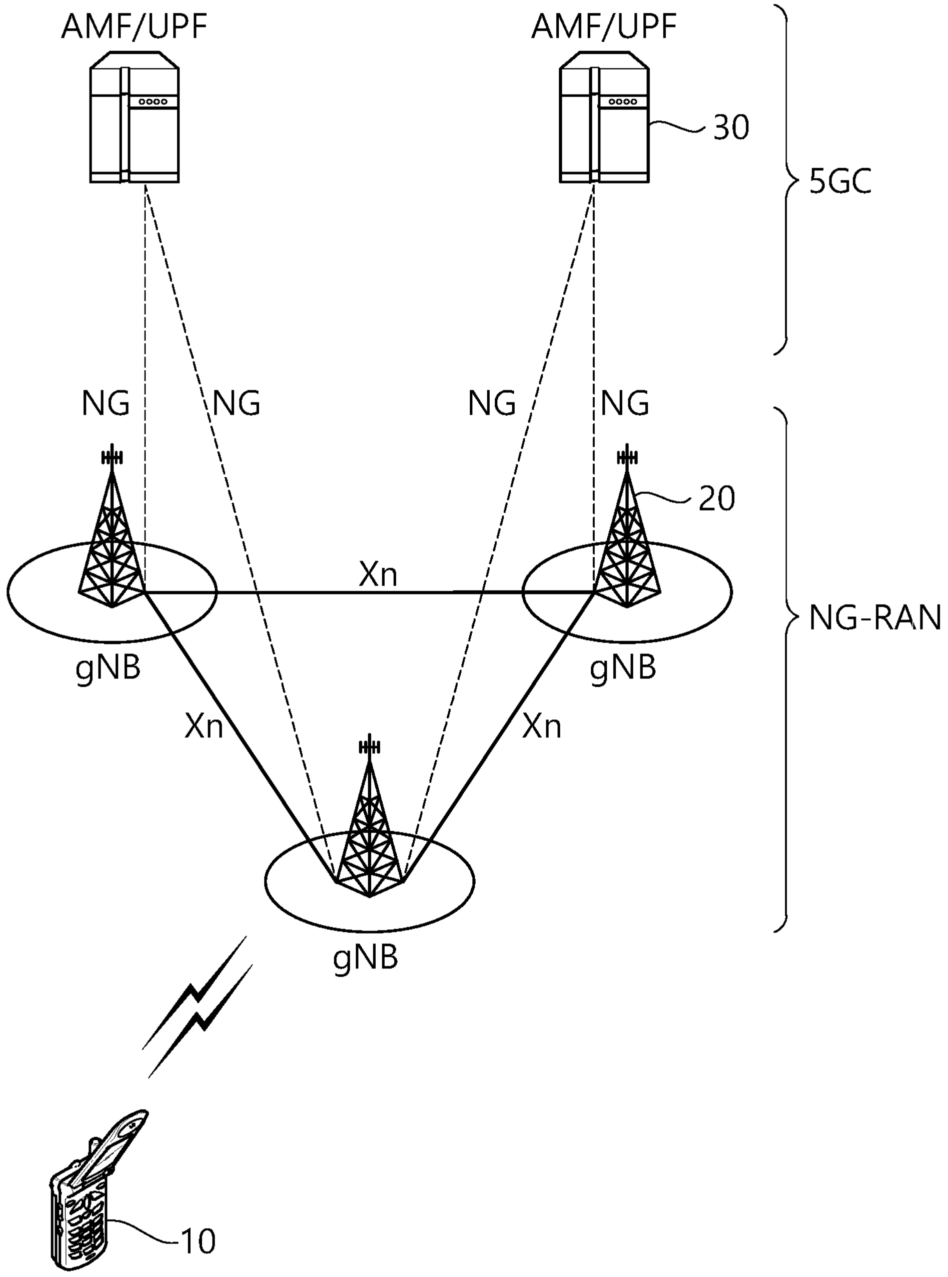
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
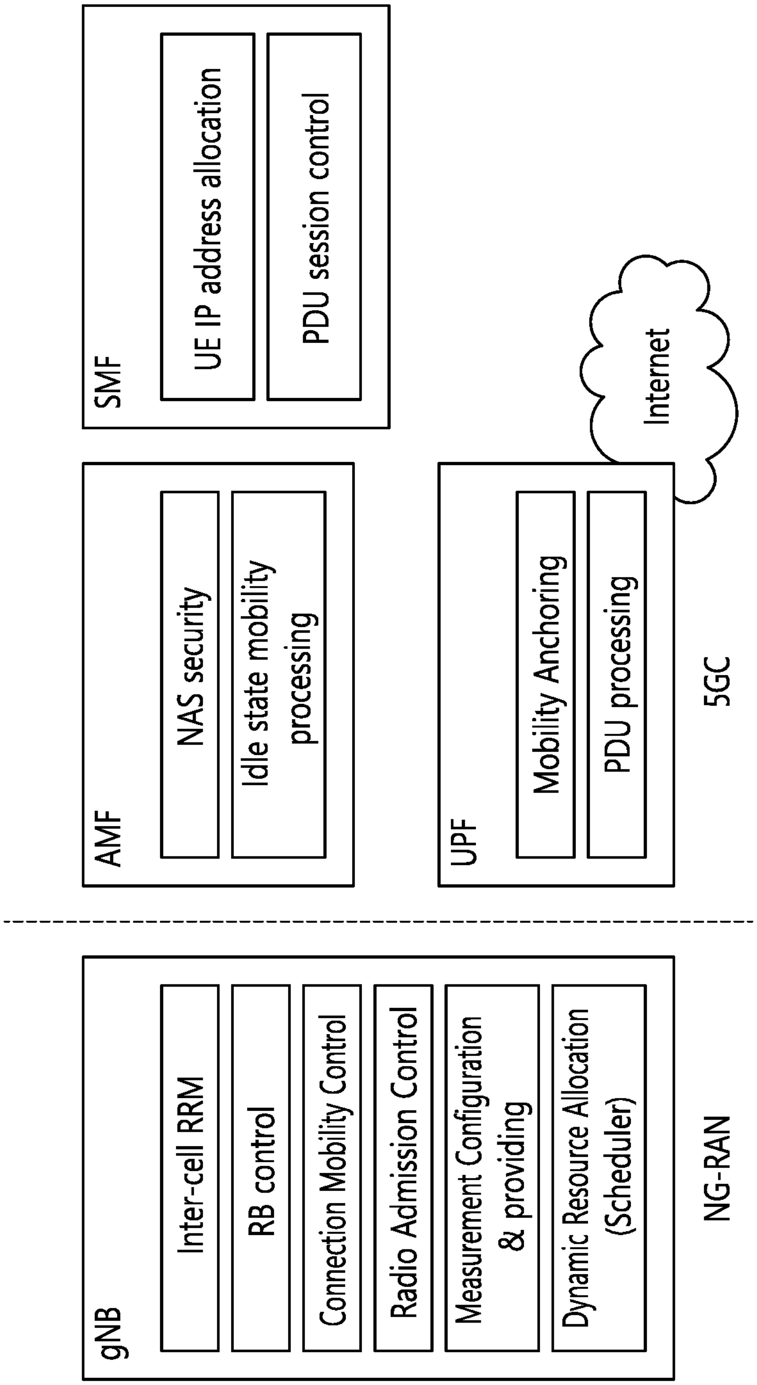
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4:
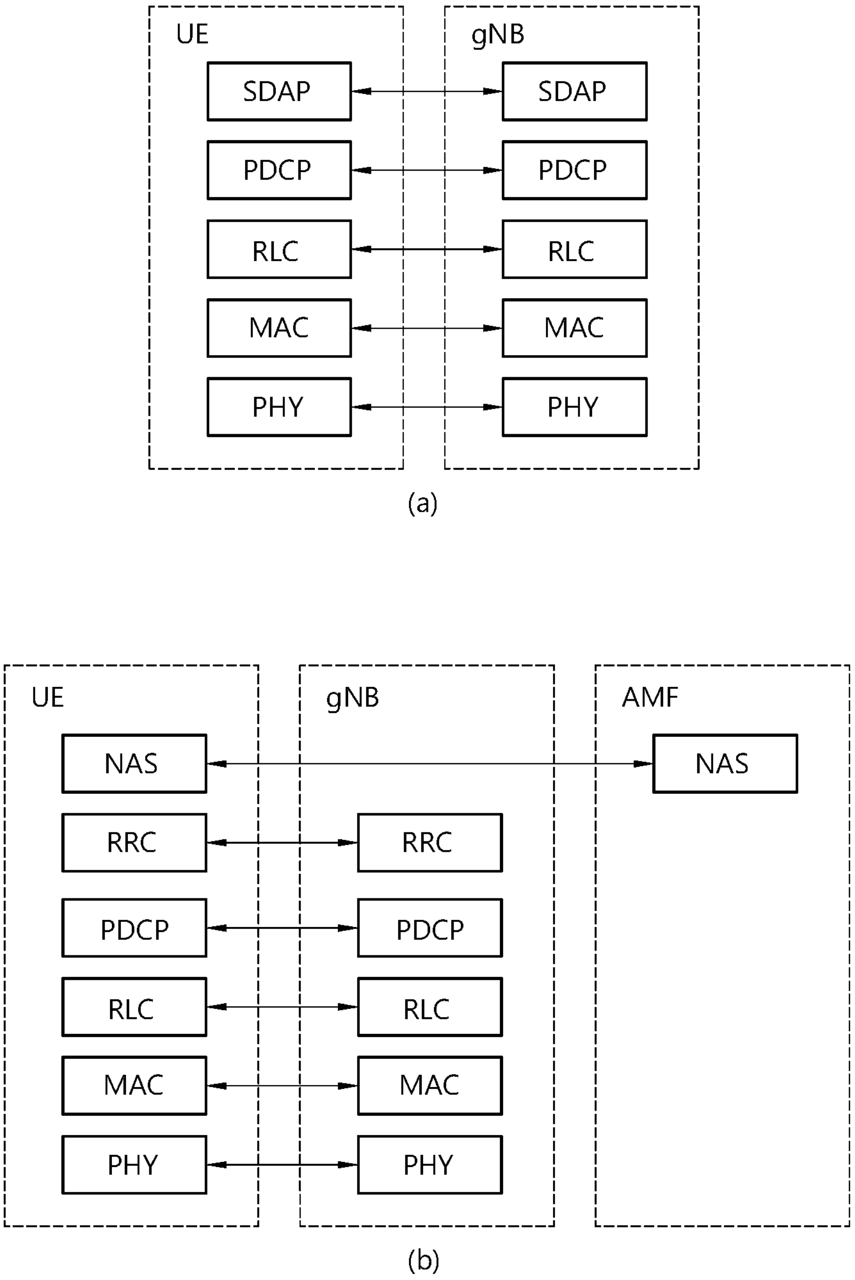
FIG. 4 shows a radio protocol architecture, based on an embodiment of the present disclosure.

FIG. 4 shows a radio protocol architecture, based on an embodiment of the present disclosure. The embodiment of FIG. 4 may be combined with various embodiments of the present disclosure. Specifically, FIG. 4(*a*) shows a radio protocol architecture for a user plane, and FIG. 4(*b*) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
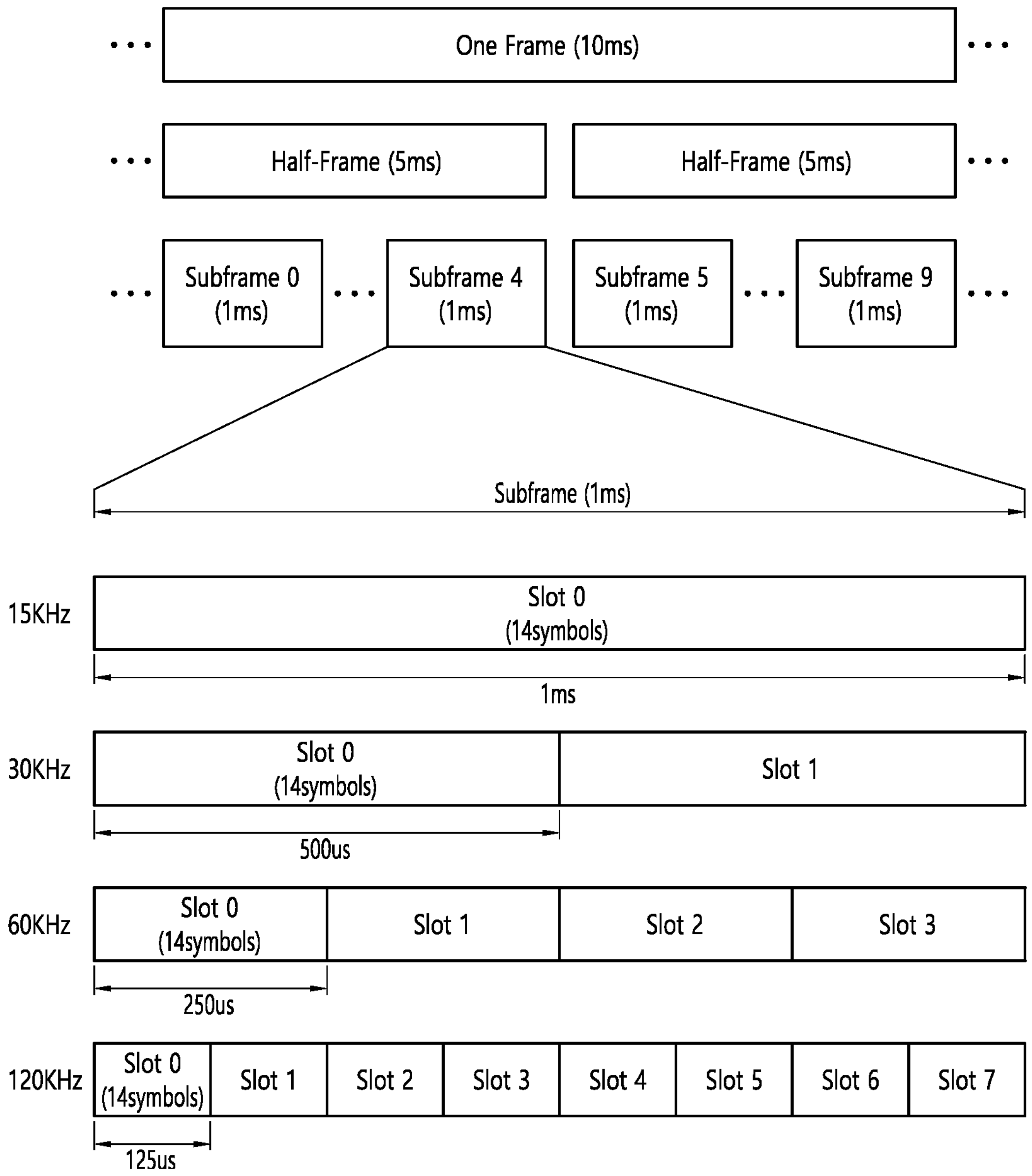
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM (A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM (A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
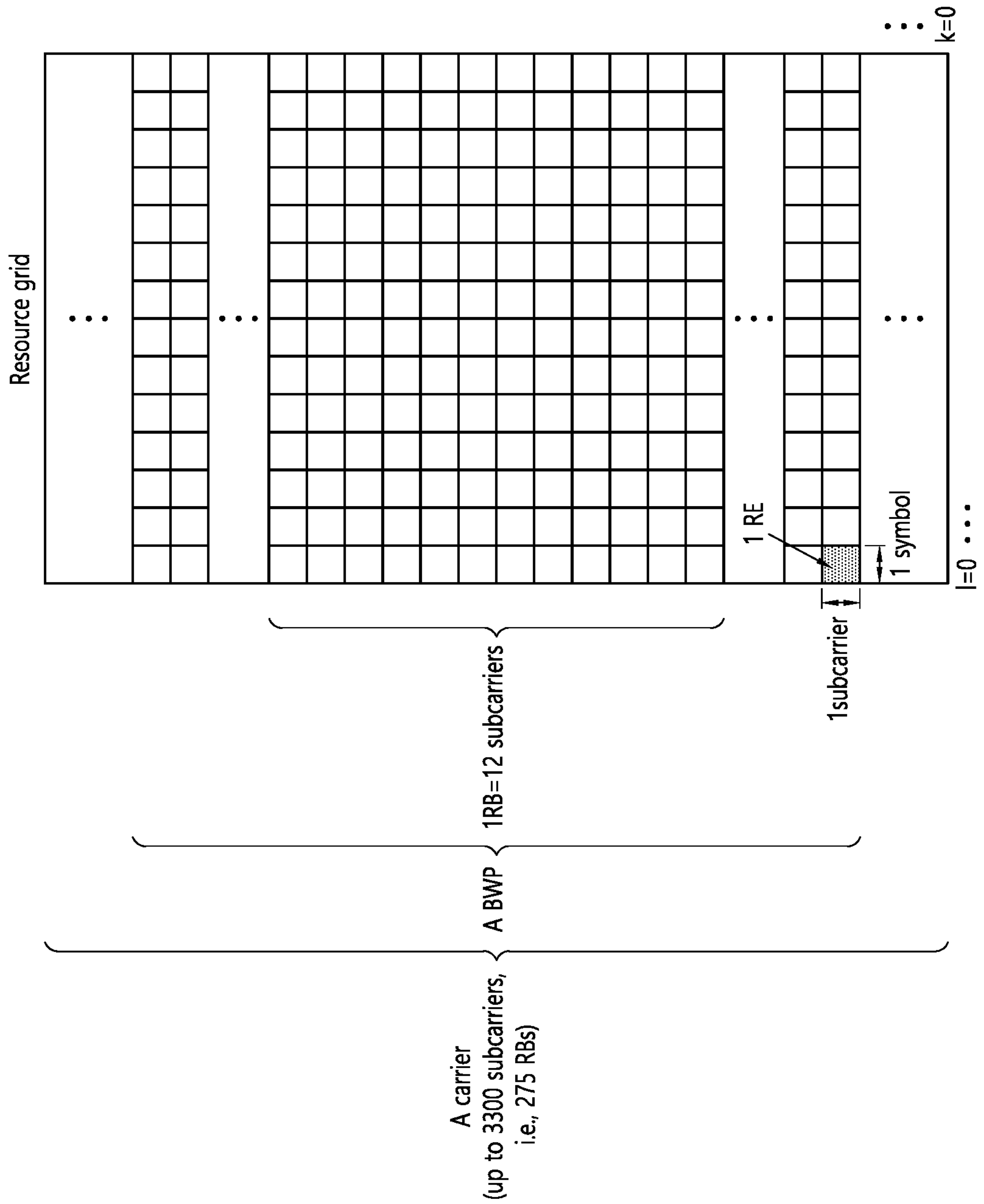
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP. Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-) configured in a carrier with respect to an out-of-coverage NR V2X UE and an RRC_IDLE UE. For the UE in the RRC_CONNECTED mode, at least one SL BWP may be activated in the carrier.

Figure 7:
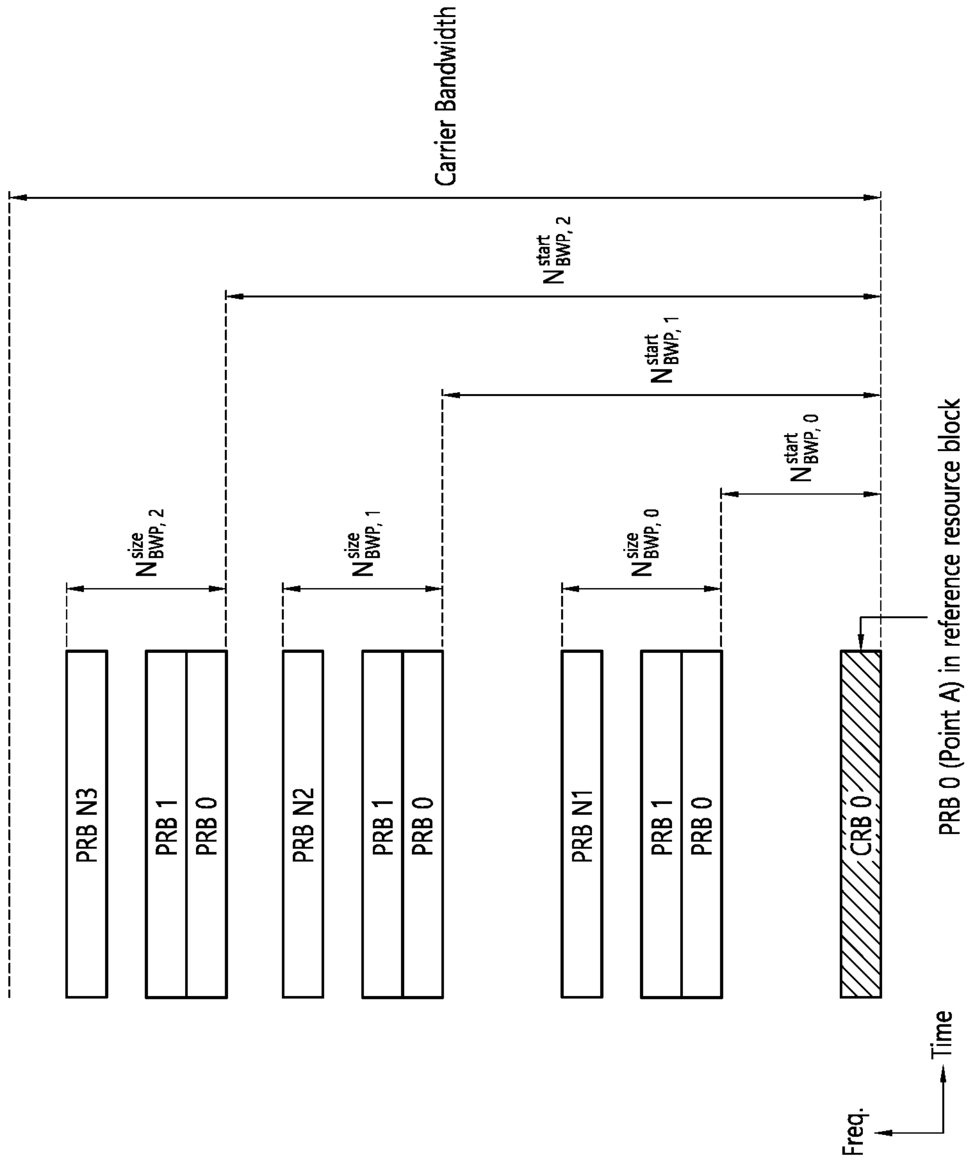
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8:
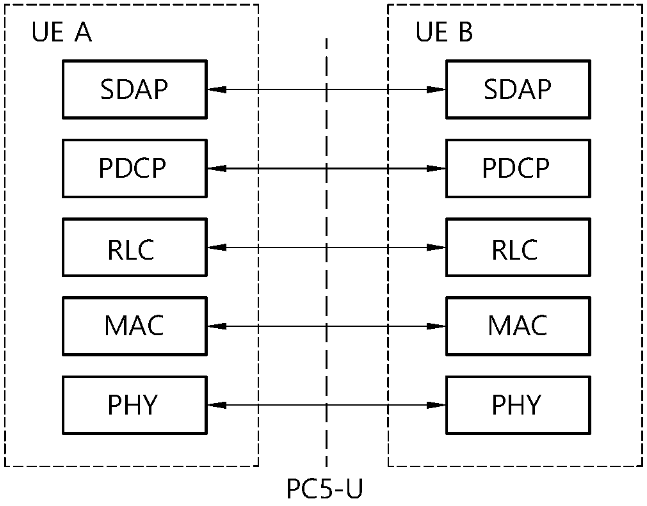
FIG. 8 shows a radio protocol architecture for a SL communication, based on an embodiment of the present disclosure.
Figure 8:
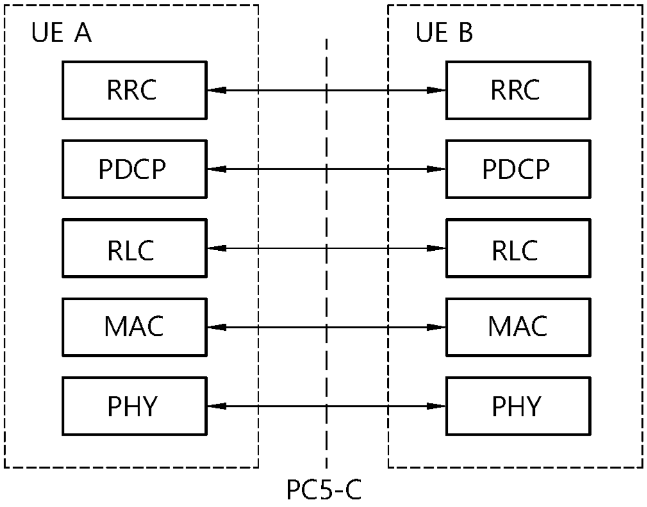

FIG. 8 shows a radio protocol architecture for a SL communication, based on an embodiment of the present disclosure. The embodiment of FIG. 8 may be combined with various embodiments of the present disclosure. More specifically, FIG. 8(*a*) shows a user plane protocol stack, and FIG. 8(*b*) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-) configured. Accordingly, the UE does not have to perform hypothesis detection at frequency to discover the S-SSB in the carrier.

Figure 9:
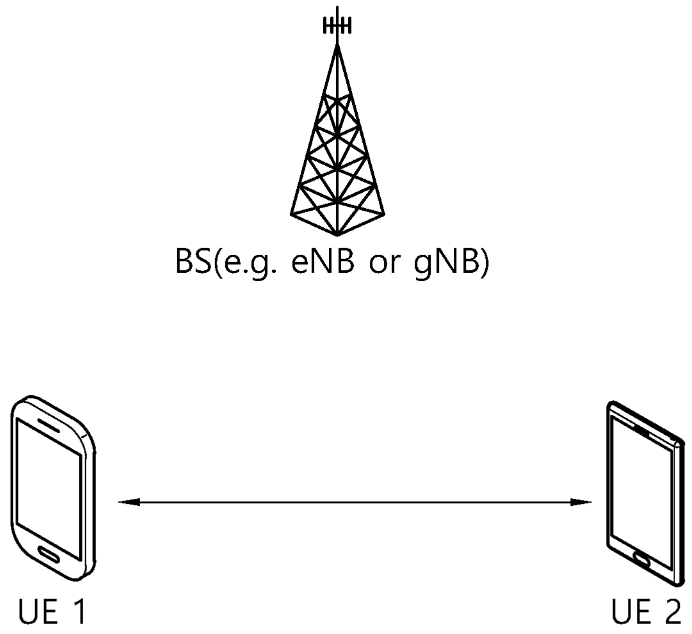
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
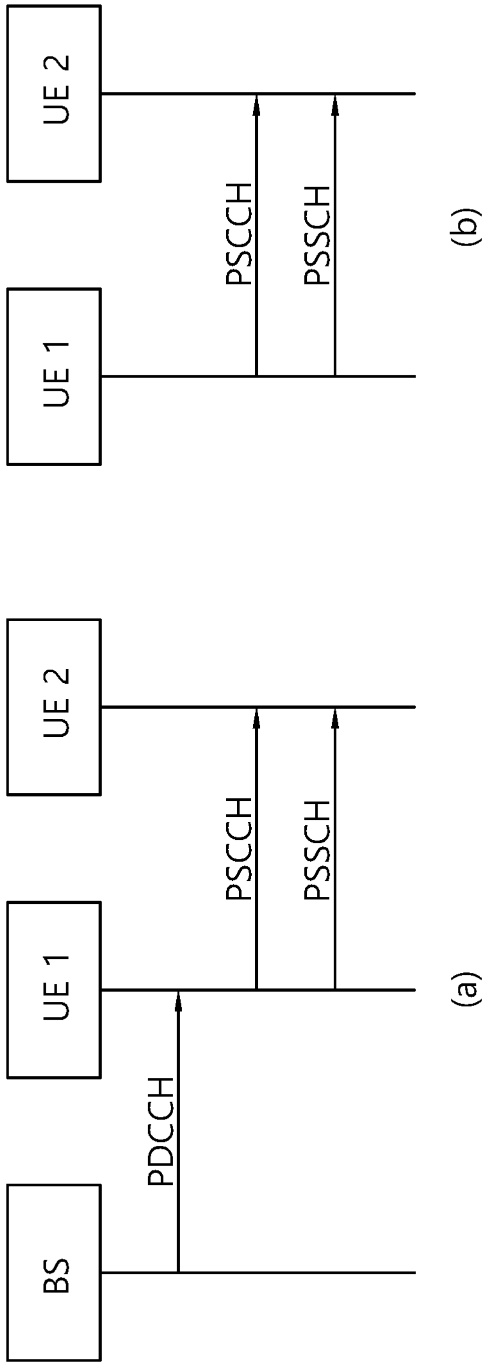
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(*a*) shows a UE operation related to an LTE transmission mode 1 or an LTE transmission mode 3. Alternatively, for example, FIG. 10(*a*) shows a UE operation related to an NR resource allocation mode 1. For example, the LTE transmission mode 1 may be applied to general SL communication, and the LTE transmission mode 3 may be applied to V2X communication.

For example, FIG. 10(*b*) shows a UE operation related to an LTE transmission mode 2 or an LTE transmission mode 4. Alternatively, for example, FIG. 10(*b*) shows a UE operation related to an NR resource allocation mode 2.

Referring to FIG. 10(*a*), in the LTE transmission mode 1, the LTE transmission mode 3, or the NR resource allocation mode 1, a BS may schedule a SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(*b*), in the LTE transmission mode 2, the LTE transmission mode 4, or the NR resource allocation mode 2, the UE may determine a SL transmission resource within a SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re) selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
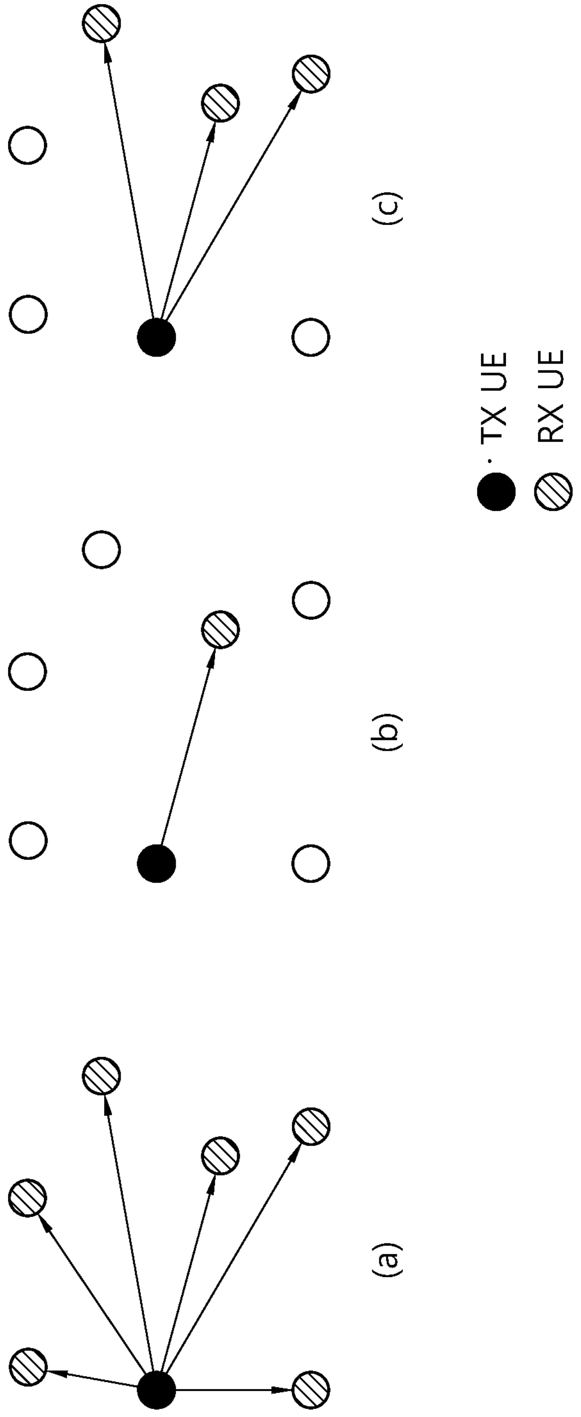
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(*a*) shows broadcast-type SL communication, FIG. 11(*b*) shows unicast type-SL communication, and FIG. 11(*c*) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 12:
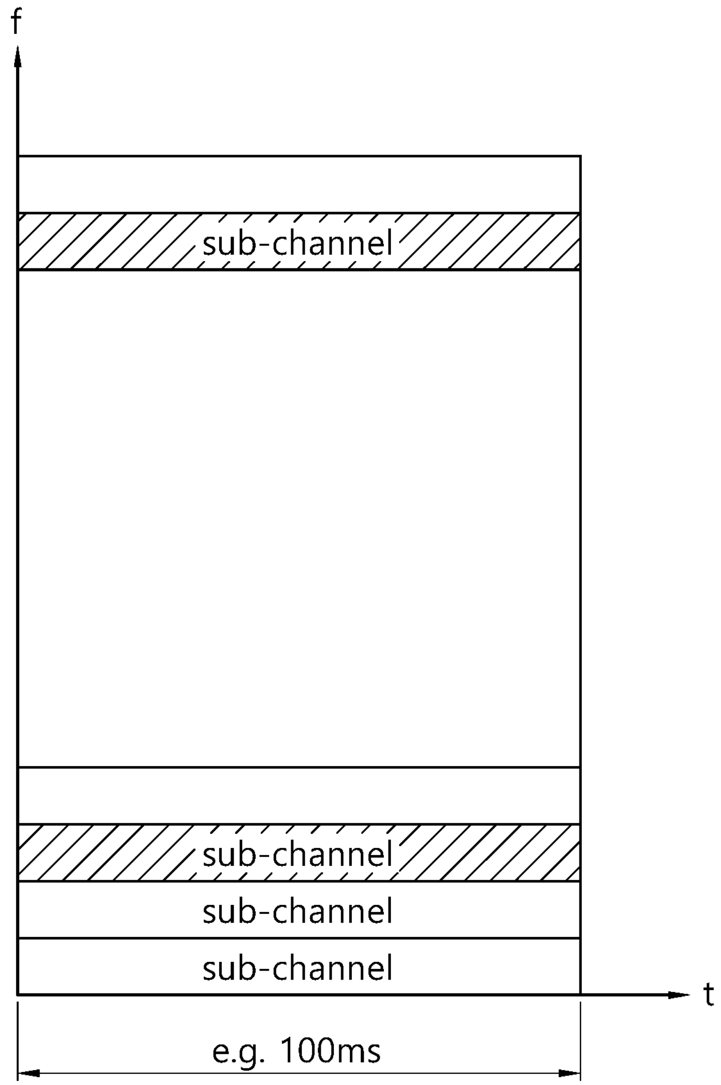
FIG. 12 shows a resource unit for CBR measurement, based on an embodiment of the present disclosure.

FIG. 12 shows a resource unit for CBR measurement, based on an embodiment of the present disclosure. The embodiment of FIG. 12 may be combined with various embodiments of the present disclosure.

Referring to FIG. 12, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 12, if it is assumed that a hatched sub-channel is a sub-channel having a value greater than or equal to a pre-configured threshold, the CBR may denote a ratio of the hatched sub-channels for a period of 100 ms. Additionally, the UE may report the CBR to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or reference signals received power (RSRP).

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a subchannel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. For example, the TX UE may be a UE which transmits SL CSI-RS(s) and/or a SL CSI report request indicator to the (target) RX UE. For example, the TX UE may be a UE which transmits (pre-defined) reference signal(s) (e.g., PSSCH demodulation reference signal (DM-RS)) and/or a SL (L1) RSRP report request indicator, to the (target) RX UE, to be used for SL (L1) RSRP measurement. For example, the TX UE may be a UE which transmits a (control) channel (e.g., PSCCH, PSSCH, etc.) and/or reference signal(s) on the (control) channel (e.g., DM-RS, CSI-RS, etc.), to be used for a SL RLM operation and/or a SL RLF operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. For example, the RX UE may be a UE which performs SL CSI transmission to the TX UE based on SL CSI-RS(s) and/or a SL CSI report request indicator received from the TX UE. For example, the RX UE is a UE which transmits a SL (L1) RSRP measurement value, to the TX UE, measured based on (pre-defined) reference signal(s) and/or a SL (L1) RSRP report request indicator received from the TX UE. For example, the RX UE may be a UE which transmits data of the RX UE to the TX UE. For example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, the TX UE may transmit at least one of the following information to the RX UE through SCI(s). Herein, for example, the TX UE may transmit at least one of the following information to the RX UE through a first SCI and/or a second SCI.

- PSSCH (and/or PSCCH) related resource allocation information (e.g., the location/number of time/frequency resources, resource reservation information (e.g., period))
- SL CSI report request indicator or SL (L1) RSRP (and/or SL (L1) RSRQ and/or SL (L1) RSSI) report request indicator
- SL CSI transmission indicator (or SL (L1) RSRP (and/or SL (L1) RSRQ and/or SL (L1) RSSI) information transmission indicator) (on a PSSCH)
- Modulation and Coding Scheme (MCS) information
- TX power information
- L1 destination ID information and/or L1 source ID information
- SL HARQ process ID information
- New Data Indicator (NDI) information
- Redundancy Version (RV) information
- (Transmission traffic/packet related) QoS information (e.g., priority information)
- SL CSI-RS transmission indicator or information on the number of antenna ports for (transmitting) SL CSI-RS
- TX UE location information or location (or distance range) information of the target RX UE (for which SL HARQ feedback is requested)
- Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, etc.

Meanwhile, in the present disclosure, for example, a PSCCH may be replaced/substituted with a SCI and/or a first SCI and/or a second SCI, or vice versa. For example, the SCI may be replaced/substituted with the PSCCH and/or the first SCI and/or the second SCI, or vice versa. For example, since the TX UE may transmit the second SCI to the RX UE through a PSSCH, the PSSCH may be replaced/substituted with the second SCI, or vice versa. For example, if SCI configuration fields are divided into two groups in consideration of a (relatively) high SCI payload size, the first SCI including a first SCI configuration field group may be referred to as a $1^{st}$ SCI or $1^{st}$-stage SCI, and the second SCI including a second SCI configuration field group may be referred to as a $2^{nd}$ SCI or $2^{nd}$-stage SCI. For example, the first SCI may be transmitted through a PSCCH. For example, the second SCI may be transmitted through a (independent) PSCCH. For example, the second SCI may be piggybacked and transmitted together with data through a PSSCH.

Meanwhile, in the present disclosure, for example, the term "configure/configured" or the term "define/defined" may refer to (pre) configuration from a base station or a network (through pre-defined signaling (e.g., SIB, MAC, RRC, etc.)) (for each resource pool). For example, "that A is configured" may mean "that the base station/network transmits information related to A to the UE".

Meanwhile, in the present disclosure, for example, an RB may be replaced/substituted with a subcarrier, or vice versa. For example, a packet or a traffic may be replaced/substituted with a transport block (TB) or a medium access control protocol data unit (MAC PDU) based on a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1

TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant. For example, in the CG type 1, a base station may allocate periodic resource(s) to a TX UE through an RRC message. For example, in the CG type 2, a base station may allocate periodic resource(s) to a TX UE through an RRC message, and the base station may dynamically activate or deactivate the periodic resource(s) through a DCI.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol. For example, a PSSCH may be replaced/substituted with a PSCCH, or vice versa.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Hereinafter, a method for a UE to transmit and receive SL HARQ feedback and an apparatus supporting the same according to various embodiments of the present disclosure will be described.

According to an embodiment of the present disclosure, the length of the time domain and/or the size of the frequency domain related to a PSCCH may be configured specifically for a resource pool. For example, the length of the time domain related to a PSCCH may be the number of symbols constituting the PSCCH. For example, according to a resource pool, a base station or a network may configure the length of the time domain and/or the size of the frequency domain related to a PSCCH within one subchannel and/or SL slot to a UE, or may pre-configure it.

And/or, for example, the length of the time domain and/or the size of the frequency domain related to a PSSCH may be configured specifically for a resource pool. For example, the length of the time domain related to a PSSCH may be the number of symbols constituting the PSSCH. For example, according to a resource pool, a base station or a network may configure the length of the time domain and/or the size of the frequency domain related to a PSSCH within one subchannel and/or SL slot to a UE, or may pre-configure it.

And/or, for example, the length of the time domain and/or the size of the frequency domain related to a PSFCH may be configured specifically for a resource pool. For example, the length of the time domain related to a PSFCH may be the number of symbols constituting the PSFCH. For example, according to a resource pool, a base station or a network may configure the length of the time domain and/or the size of the frequency domain related to a PSFCH within one subchannel and/or SL slot to a UE, or may pre-configure it.

And/or, for example, the length of the time domain and/or the size of the frequency domain related to a PSCCH may be configured specifically for a service type. For example, according to a service type, a base station or a network may configure the length of the time domain and/or the size of the frequency domain related to a PSCCH within one subchannel and/or SL slot to a UE, or may pre-configure it. And/or, for example, the length of the time domain and/or the size of the frequency domain related to a PSSCH may be configured specifically for a service type. For example, according to a service type, a base station or a network may configure the length of the time domain and/or the size of the frequency domain related to a PSSCH within one subchannel and/or SL slot to a UE, or may pre-configure it. And/or, for example, the length of the time domain and/or the size of the frequency domain related to a PSFCH may be configured specifically for a service type. For example, according to a service type, a base station or a network may configure the length of the time domain and/or the size of the frequency domain related to a PSFCH within one subchannel and/or SL slot to a UE, or may pre-configure it.

And/or, for example, the length of the time domain and/or the size of the frequency domain related to a PSCCH may be configured specifically for a service priority. For example, according to a service priority, a base station or a network may configure the length of the time domain and/or the size of the frequency domain related to a PSCCH within one subchannel and/or SL slot to a UE, or may pre-configure it. And/or, for example, the length of the time domain and/or the size of the frequency domain related to a PSSCH may be configured specifically for a service priority. For example, according to a service priority, a base station or a network may configure the length of the time domain and/or the size of the frequency domain related to a PSSCH within one subchannel and/or SL slot to a UE, or may pre-configure it. And/or, for example, the length of the time domain and/or the size of the frequency domain related to a PSFCH may be configured specifically for a service priority. For example, according to a service priority, a base station or a network may configure the length of the time domain and/or the size of the frequency domain related to a PSFCH within one subchannel and/or SL slot to a UE, or may pre-configure it.

And/or, for example, the length of the time domain and/or the size of the frequency domain related to a PSCCH may be configured specifically for a cast type. For example, according to a cast type, a base station or a network may configure the length of the time domain and/or the size of the frequency domain related to a PSCCH within one subchannel and/or SL slot to a UE, or may pre-configure it. And/or, for example, the length of the time domain and/or the size of the frequency domain related to a PSSCH may be configured specifically for a cast type. For example, according to a cast type, a base station or a network may configure the length of the time domain and/or the size of the frequency domain related to a PSSCH within one subchannel and/or SL slot to a UE, or may pre-configure it. And/or, for example, the length of the time domain and/or the size of the frequency domain related to a PSFCH may be configured specifically for a cast type. For example, according to a cast type, a base station or a network may configure the length of the time domain and/or the size of the frequency domain related to a PSFCH within one subchannel and/or SL slot to a UE, or may pre-configure it.

And/or, for example, the length of the time domain and/or the size of the frequency domain related to a PSCCH may be configured specifically for a destination UE. For example, according to a destination UE, a base station or a network may configure the length of the time domain and/or the size of the frequency domain related to a PSCCH within one subchannel and/or SL slot to a UE, or may pre-configure it. And/or, for example, the length of the time domain and/or the size of the frequency domain related to a PSSCH may be configured specifically for a destination UE. For example, according to a destination UE, a base station or a network may configure the length of the time domain and/or the size of the frequency domain related to a PSSCH within one subchannel and/or SL slot to a UE, or may pre-configure it. And/or, for example, the length of the time domain and/or the size of the frequency domain related to a PSFCH may be configured specifically for a destination UE. For example, according to a destination UE, a base station or a network may configure the length of the time domain and/or the size of the frequency domain related to a PSFCH within one subchannel and/or SL slot to a UE, or may pre-configure it.

And/or, for example, the length of the time domain and/or the size of the frequency domain related to a PSCCH may be configured specifically for a (L1 or L2) destination ID. For example, according to a (L1 or L2) destination ID, a base station or a network may configure the length of the time domain and/or the size of the frequency domain related to a PSCCH within one subchannel and/or SL slot to a UE, or may pre-configure it. And/or, for example, the length of the time domain and/or the size of the frequency domain related to a PSSCH may be configured specifically for a (L1 or L2) destination ID. For example, according to a (L1 or L2) destination ID, a base station or a network may configure the length of the time domain and/or the size of the frequency domain related to a PSSCH within one subchannel and/or SL slot to a UE, or may pre-configure it. And/or, for example, the length of the time domain and/or the size of the frequency domain related to a PSFCH may be configured specifically for a (L1 or L2) destination ID. For example, according to a (L1 or L2) destination ID, a base station or a network may configure the length of the time domain and/or the size of the frequency domain related to a PSFCH within one subchannel and/or SL slot to a UE, or may pre-configure it.

And/or, for example, the length of the time domain and/or the size of the frequency domain related to a PSCCH may be configured specifically for a (L1 or L2) source ID. For example, according to a (L1 or L2) source ID, a base station or a network may configure the length of the time domain and/or the size of the frequency domain related to a PSCCH within one subchannel and/or SL slot to a UE, or may pre-configure it. And/or, for example, the length of the time domain and/or the size of the frequency domain related to a PSSCH may be configured specifically for a (L1 or L2) source ID. For example, according to a (L1 or L2) source ID, a base station or a network may configure the length of the time domain and/or the size of the frequency domain related to a PSSCH within one subchannel and/or SL slot to a UE, or may pre-configure it. And/or, for example, the length of the time domain and/or the size of the frequency domain related to a PSFCH may be configured specifically for a (L1 or L2) source ID. For example, according to a (L1 or L2) source ID, a base station or a network may configure the length of the time domain and/or the size of the frequency domain related to a PSFCH within one subchannel and/or SL slot to a UE, or may pre-configure it.

And/or, for example, the length of the time domain and/or the size of the frequency domain related to a PSCCH may be configured specifically for a QoS parameter. For example, according to a QoS parameter, a base station or a network may configure the length of the time domain and/or the size of the frequency domain related to a PSCCH within one subchannel and/or SL slot to a UE, or may pre-configure it. And/or, for example, the length of the time domain and/or the size of the frequency domain related to a PSSCH may be configured specifically for a QoS parameter. For example, according to a QoS parameter, a base station or a network may configure the length of the time domain and/or the size of the frequency domain related to a PSSCH within one subchannel and/or SL slot to a UE, or may pre-configure it. And/or, for example, the length of the time domain and/or the size of the frequency domain related to a PSFCH may be configured specifically for a QoS parameter. For example, according to a QoS parameter, a base station or a network may configure the length of the time domain and/or the size of the frequency domain related to a PSFCH within one subchannel and/or SL slot to a UE, or may pre-configure it.

And/or, for example, the length of the time domain and/or the size of the frequency domain related to a PSCCH may be configured specifically for a (GROUPCAST) SL HARQ feedback type. For example, according to a (GROUPCAST) SL HARQ feedback type, a base station or a network may configure the length of the time domain and/or the size of the frequency domain related to a PSCCH within one subchannel and/or SL slot to a UE, or may pre-configure it. And/or, for example, the length of the time domain and/or the size of the frequency domain related to a PSSCH may be configured specifically for a (GROUPCAST) SL HARQ feedback type. For example, according to a (GROUPCAST) SL HARQ feedback type, a base station or a network may configure the length of the time domain and/or the size of the frequency domain related to a PSSCH within one subchannel and/or SL slot to a UE, or may pre-configure it. And/or, for example, the length of the time domain and/or the size of the frequency domain related to a PSFCH may be configured specifically for a (GROUPCAST) SL HARQ feedback type. For example, according to a (GROUPCAST) SL HARQ feedback type, a base station or a network may configure the length of the time domain and/or the size of the frequency domain related to a PSFCH within one subchannel and/or SL slot to a UE, or may pre-configure it. For example, (GROUPCAST) SL HARQ feedback type may include a method of transmitting NACK information only when a UE fails to decode/receive PSSCH, and a method for transmitting ACK information if a UE succeeds in decoding/receiving PSSCH, and transmitting NACK information if it fails.

And/or, for example, the length of the time domain and/or the size of the frequency domain related to a PSCCH may be configured specifically for (resource pool) congestion level. For example, according to (resource pool) congestion level, a base station or a network may configure the length of the time domain and/or the size of the frequency domain related to a PSCCH within one subchannel and/or SL slot to a UE, or may pre-configure it. And/or, for example, the length of the time domain and/or the size of the frequency domain related to a PSSCH may be configured specifically for (resource pool) congestion level. For example, according to (resource pool) congestion level, a base station or a network may configure the length of the time domain and/or the size of the frequency domain related to a PSSCH within one subchannel and/or SL slot to a UE, or may pre-configure it. And/or, for example, the length of the time domain and/or the size of the frequency domain related to a PSFCH may be configured specifically for (resource pool) congestion level. For example, according to (resource pool) congestion level, a base station or a network may configure the length of the time domain and/or the size of the frequency domain related to a PSFCH within one subchannel and/or SL slot to a UE, or may pre-configure it.

And/or, for example, the length of the time domain and/or the size of the frequency domain related to a PSCCH may be configured specifically for a mode type. For example, according to a mode type, a base station or a network may configure the length of the time domain and/or the size of the frequency domain related to a PSCCH within one subchannel and/or SL slot to a UE, or may pre-configure it. And/or, for example, the length of the time domain and/or the size of the frequency domain related to a PSSCH may be configured specifically for a mode type. For example, according to a mode type, a base station or a network may configure the length of the time domain and/or the size of the frequency domain related to a PSSCH within one subchannel and/or SL slot to a UE, or may pre-configure it. And/or, for example, the length of the time domain and/or the size of the frequency domain related to a PSFCH may be configured specifically for a mode type. For example, according to a mode type, a base station or a network may configure the length of the time domain and/or the size of the frequency domain related to a PSFCH within one subchannel and/or SL slot to a UE, or may pre-configure it. For example, a mode type may include resource allocation mode 1 and/or resource allocation mode 2.

And/or, for example, the length of the time domain and/or the size of the frequency domain related to a PSCCH may be configured specifically for whether a UE transmits SL CSI ONLY. For example, according to whether a UE transmits SL CSI only, a base station or a network may configure the length of the time domain and/or the size of the frequency domain related to a PSCCH within one subchannel and/or SL slot to a UE, or may pre-configure it. And/or, for example, the length of the time domain and/or the size of the frequency domain related to a PSSCH may be configured specifically for whether a UE transmits SL CSI ONLY. For example, according to whether a UE transmits SL CSI only, a base station or a network may configure the length of the time domain and/or the size of the frequency domain related to a PSSCH within one subchannel and/or SL slot to a UE, or may pre-configure it. And/or, for example, the length of the time domain and/or the size of the frequency domain related to a PSFCH may be configured specifically for whether a UE transmits SL CSI ONLY. For example, according to whether a UE transmits SL CSI only, a base station or a network may configure the length of the time domain and/or the size of the frequency domain related to a PSFCH within one subchannel and/or SL slot to a UE, or may pre-configure it.

And/or, for example, the length of the time domain and/or the size of the frequency domain related to a PSCCH may be configured specifically for a numerology. For example, according to a numerology, a base station or a network may configure the length of the time domain and/or the size of the frequency domain related to a PSCCH within one subchannel and/or SL slot to a UE, or may pre-configure it. And/or, for example, the length of the time domain and/or the size of the frequency domain related to a PSSCH may be configured specifically for a numerology. For example, according to a numerology, a base station or a network may configure the length of the time domain and/or the size of the frequency domain related to a PSSCH within one subchannel and/or SL slot to a UE, or may pre-configure it. And/or, for example, the length of the time domain and/or the size of the frequency domain related to a PSFCH may be configured specifically for a numerology. For example, according to a numerology, a base station or a network may configure the length of the time domain and/or the size of the frequency domain related to a PSFCH within one subchannel and/or SL slot to a UE, or may pre-configure it. For example, a numerology may include subcarrier spacing and/or CP length.

And/or, for example, the length of the time domain and/or the size of the frequency domain related to a PSCCH may be configured specifically for an initial transmission or a retransmission. For example, depending on whether a PSCCH is a channel related to an initial transmission or a channel related to a retransmission, a base station or a network may configure the length of the time domain and/or the size of the frequency domain related to a PSCCH within one subchannel and/or SL slot to a UE, or may pre-configure it. And/or, for example, the length of the time domain and/or the size of the frequency domain related to a PSSCH may be configured specifically for an initial transmission or a retransmission. For example, depending on whether a PSSCH is a channel related to an initial transmission or a channel related to a retransmission, a base station or a network may configure the length of the time domain and/or the size of the frequency domain related to a PSSCH within one subchannel and/or SL slot to a UE, or may pre-configure it. And/or, for example, the length of the time domain and/or the size of the frequency domain related to a PSFCH may be configured specifically for an initial transmission or a retransmission. For example, depending on whether a PSFCH is a channel related to an initial transmission or a channel related to a retransmission, a base station or a network may configure the length of the time domain and/or the size of the frequency domain related to a PSFCH within one subchannel and/or SL slot to a UE, or may pre-configure it.

According to an embodiment of the present disclosure, a processing time required from the last time a UE receives a PSSCH to the time at which the UE starts transmitting a PSFCH may be defined as a UE capability of the UE. For example, a processing time required from the last time a UE receives a PSCCH to the time at which the UE starts transmitting a PSFCH may be defined as a UE capability of the UE. For example, a processing time required from the last time a UE receives a PSCCH to the start time of the (linked) PSSCH transmission may be defined as a UE capability of the UE. And, for example, a UE may report information on a UE capability to a base station. For example, a UE performing SL communication based on MODE 1 (hereinafter, a MODE 1 UE) may report information on UE capability to a base station. Or, for example, a UE may report information on a UE capability to other (target) UE. For example, a UE performing SL communication based on MODE 2 (hereinafter, a MODE 2 UE) may report information on UE capability to another (target) UE.

Here, for example, information on a UE capability may be defined differently or independently, according to at least one of a numerology, an SL communication-related numerology, a service type, a service priority, a QoS parameter, (resource pool) congestion level, and/or a mode type. For example, numerology may include subcarrier spacing and/or CP length. For example, a mode type may include resource allocation mode 1 and/or resource allocation mode 2.

According to an embodiment of the present disclosure, when the last symbol of a PSSCH transmitted by a TX UE to an RX UE is located on slot #N, the RX UE may transmit a PSFCH related to the PSSCH to the TX UE, on the nearest slot including a PSFCH resource among a slot #(N+K) or slots after slot #(N+K). For example, when the last symbol of a PSSCH transmitted by a TX UE to an RX UE is located on slot #N, the RX UE may transmit SL HARQ feedback for the PSSCH to the TX UE, on the nearest slot including a PSFCH resource among a slot #(N+K) and slots after slot #(N+K).

And/or, for example, when the last symbol of a PSCCH transmitted by a TX UE to an RX UE is located on slot #N, the RX UE may transmit a PSFCH related to the PSCCH to the TX UE, on the nearest slot including a PSFCH resource among a slot #(N+K) and slots after slot #(N+K). For example, when the last symbol of a PSCCH transmitted by a TX UE to an RX UE is located on slot #N, the RX UE may transmit SL HARQ feedback related to a PSCCH to the TX UE, on the nearest slot including a PSFCH resource among a slot #(N+K) and slots after slot #(N+K).

And/or, for example, when the last symbol of a PSSCH received by an RX UE from a TX UE is located on slot #N, the RX UE may transmit a PSFCH related to the PSSCH to the TX UE, on the nearest slot including a PSFCH resource among a slot #(N+K) and slots after slot #(N+K). For example, when the last symbol of a PSSCH received by an RX UE from a TX UE is located on slot #N, the RX UE may transmit SL HARQ feedback for the PSSCH to the TX UE, on the nearest slot including a PSFCH resource among a slot #(N+K) and slots after slot #(N+K).

And/or, for example, when the last symbol of a PSCCH received by an RX UE from a TX UE is located on slot #N, the RX UE may transmit a PSFCH related to the PSCCH to the TX UE, on the nearest slot including a PSFCH resource among a slot #(N+K) and slots after slot #(N+K). For example, when the last symbol of a PSCCH received by an RX UE from a TX UE is located on slot #N, the RX UE may transmit SL HARQ feedback for the PSCCH to the TX UE, on the nearest slot including a PSFCH resource among a slot #(N+K) and slots after slot #(N+K).

For example, the K value may be configured for an RX UE and/or a TX UE. For example, a base station or a network may transmit information related to a K value to an RX UE and/or a TX UE. For example, the information on the K value may be referred to as MinTimeGapPSFCH. For example, the K value may indicate a minimum time gap between transmission/reception for PSCCH/PSSCH and transmission/reception for PSFCH related to the PSCCH/PSSCH.

For example, the K value may be configured specifically for a resource pool, a service type, a service priority, a cast type, a destination UE, a (L1 or L2) destination ID, a (L1 or L2) source ID, a QoS parameter, (resource pool) congestion level, a mode type, a numerology and/or a UE type. For example, the K value may be configured per resource pool. And/or, for example, the K value may be configured per service type. And/or, for example, the K value may be configured per service priority. And/or, for example, the K value may be configured per cast type. And/or, for example, the K value may be configured per destination UE. And/or, for example, the K value may be configured per (L1 or L2) destination ID. And/or, for example, the K value may be configured per (L1 or L2) source ID. And/or, for example, the K value may be configured per QoS parameter. And/or, for example, the K value may be configured per (resource pool) congestion level. And/or, for example, the K value may be configured per mode type. And/or, for example, the K value may be configured per numerology. And/or, for example, the K value may be configured per UE type. For example, a UE type may include a pedestrian UE or a vehicle UE. For example, assuming that the processing time of a pedestrian UE is longer than the processing time of a vehicle UE, a K value configured for a pedestrian UE may be greater than a K value configured for a vehicle UE. For example, one K value may be configured in a resource pool. For example, one K value may be configured in a reception resource pool. For example, one K value may be configured for all UEs in a resource pool.

For example, according to at least one of the length of the time domain of a PSCCH transmitted by a TX UE, the location of a PSCCH, the location of a start symbol of a PSCCH, and/or the location of the last symbol of a PSCCH, the timing at which an RX UE starts and/or ends decoding of a PSSCH may be changed. And/or, for example, according to at least one of the length of the time domain of a PSCCH transmitted by a TX UE, the location of a PSCCH, the location of a start symbol of a PSCCH, and/or the location of the last symbol of a PSCCH, the timing at which an RX UE starts and/or ends a transmission of a PSFCH may be changed.

And/or, for example, according to at least one of the number of symbols to which second SCI transmitted by a TX UE is mapped, the location of a symbol to which second SCI is mapped, the location of a start symbol to which second SCI is mapped, and/or the location of the last symbol to which second SCI is mapped, the timing at which an RX UE starts and/or ends decoding of a PSSCH may be changed. And/or, for example, according to at least one of the number of symbols to which second SCI transmitted by a TX UE is mapped, the location of a symbol to which second SCI is mapped, the location of a start symbol to which second SCI is mapped, and/or the location of the last symbol to which second SCI is mapped, the timing at which an RX UE starts and/or ends a transmission of a PSFCH may be changed.

For example, as the length of the time domain of a PSCCH transmitted by a TX UE is longer, the time when an RX UE starts and/or ends a decoding of a PSSCH may be delayed, and the time when an RX UE starts and/or ends a transmission of a PSFCH may be delayed. And/or, for example, as the last symbol of a PSCCH transmitted by a TX UE is located later in a slot, the time when an RX UE starts and/or ends a decoding of a PSSCH may be delayed, and the time when an RX UE starts and/or ends a transmission of a PSFCH may be delayed. And/or, for example, as a start symbol of a PSCCH transmitted by a TX UE is located later in a slot, the time when an RX UE starts and/or ends a decoding of a PSSCH may be delayed, and the time when an RX UE starts and/or ends a transmission of a PSFCH may be delayed. And/or, for example, as the number of symbols to which second SCI transmitted by a TX UE is mapped increases, the time when an RX UE starts and/or ends a decoding of a PSSCH may be delayed, and the time when an RX UE starts and/or ends a transmission of a PSFCH may be delayed. And/or, for example, as the last symbol to which second SCI transmitted by a TX UE is mapped is located later in a slot, the time when an RX UE starts and/or ends a decoding of a PSSCH may be delayed, and the time when an RX UE starts and/or ends a transmission of a PSFCH may be delayed. And/or, for example, as a start symbol to which second SCI transmitted by a TX UE is mapped is located later in a slot, the time when an RX UE starts and/or ends a decoding of a PSSCH may be delayed, and the time when an RX UE starts and/or ends a transmission of a PSFCH may be delayed.

For example, a K value may be counted or determined based on logical slots (For example, the number of logical slots) on a resource pool. For example, a K value may be counted or determined based on a physical slot (For example, the number of physical slots). For example, a K value may be counted or determined based on a physical slot (For example, the number of physical slots) regardless of a resource pool. For example, a K value may be counted or determined based on a physical slot (For example, the number of physical slots) on the system regardless of a resource pool.

Figure 13:
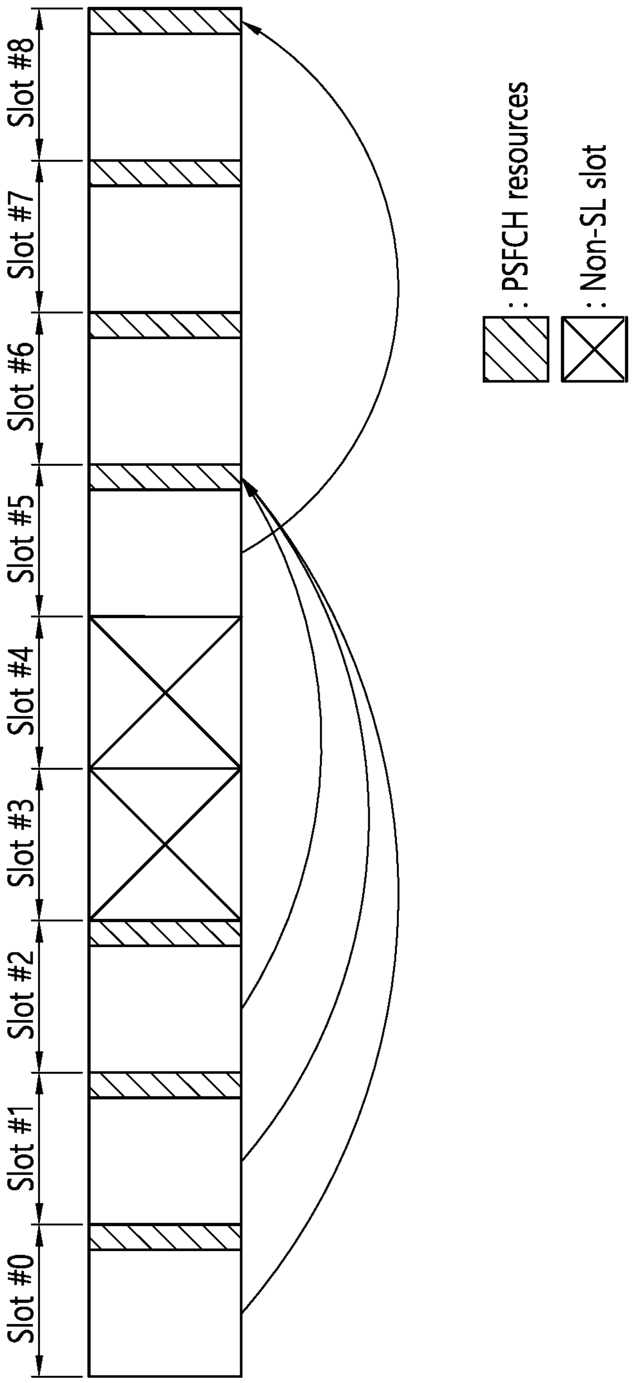
FIG. 13 shows an example of a K value indicating the number of physical slots according to an embodiment of the present disclosure.

FIG. 13 shows an example of a K value indicating the number of physical slots according to an embodiment of the present disclosure. The embodiment of FIG. 13 may be combined with various embodiments of the present disclosure.

Figure 14:
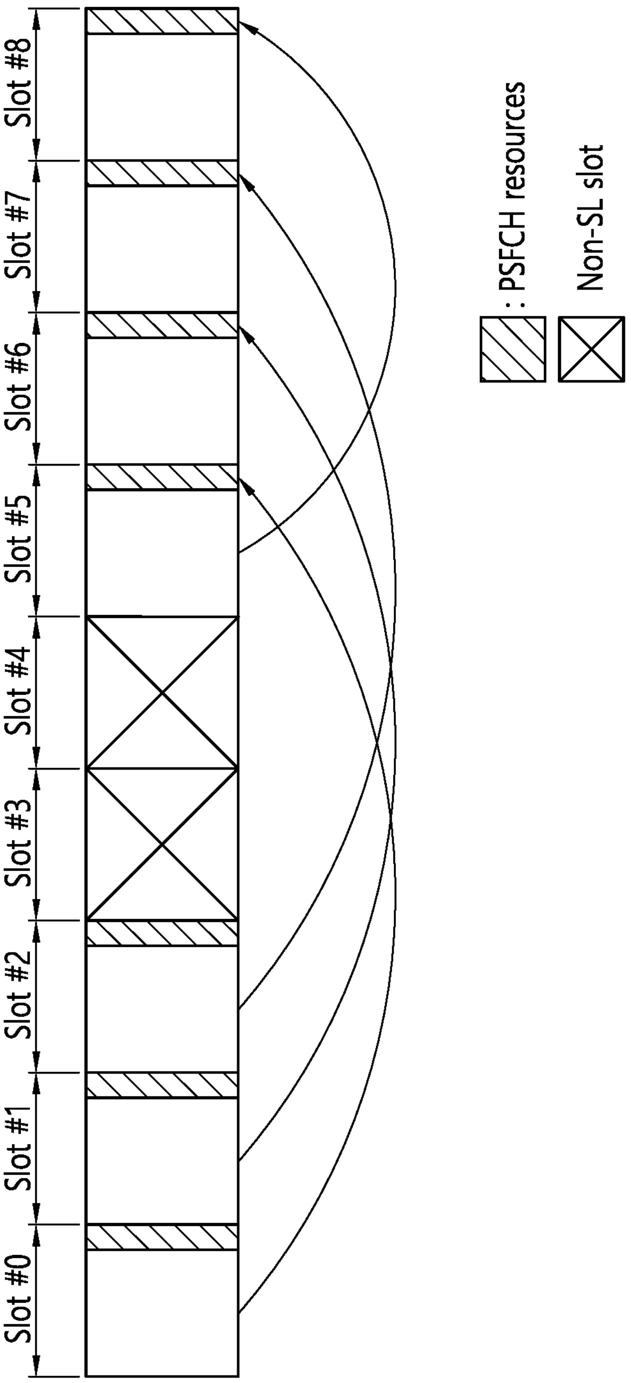
FIG. 14 shows an example of a K value indicating the number of logical slots according to an embodiment of the present disclosure.

FIG. 14 shows an example of a K value indicating the number of logical slots according to an embodiment of the present disclosure. The embodiment of FIG. 14 may be combined with various embodiments of the present disclosure.

For example, within a resource pool, a PSFCH resource may appear as a subset of slots with a constant period N. Meanwhile, the time interval between PSSCH and the relevant PSFCH resource for HARQ feedback may be derived as K. For example, referring to FIG. 13, even when N is 1, the number of PSSCH slots related to the same PSFCH slot may be greater than N according to an SL resource pool configuration in the time domain. In this case, if N is large (e.g., N=4), the number of HARQ feedback bits required depending on SL resource pool in the time domain may be greater than 4, and accordingly, a PSFCH resource shortage problem may occur. Therefore, for simplicity, a UE may consider/determine that the number of PSSCH slots related to the same PSFCH slot has an upper limit to a specific value.

For example, a UE may consider/determine that K is defined as the number of logical slots. In this case, as in the embodiment of FIG. 14, the number of PSSCH slots related to the same PSFCH slot may be equal to N. In this case, the required number of HARQ feedback bits may be N, and PSFCH transmission may occur in all PSFCH slots. However, in this case, the timing between PSSCH and HARQ feedback may be large. For example, in the timing between PSSCH and HARQ feedback, K may be the number of logical slots (e.g., slots in an RS resource pool).

On the other hand, in various embodiments of the present disclosure, "the location of the last symbol" or "the location of the last symbol to which ~ is mapped" may be replaced/changed with "the (allowed/configured in a resource pool) rearmost symbol that can be located in an SL slot". And/or, for example, "the location of a start symbol" or "the location of a start symbol to which ~ is mapped" may be replaced/changed with the (allowed/configured in a resource pool) earliest symbol that can be located in an SL slot.

According to an embodiment of the present disclosure, considering that the decoding time of a PSSCH and/or the transmission time of a PSFCH are changed, a K value may be configured or determined.

Figure 15:
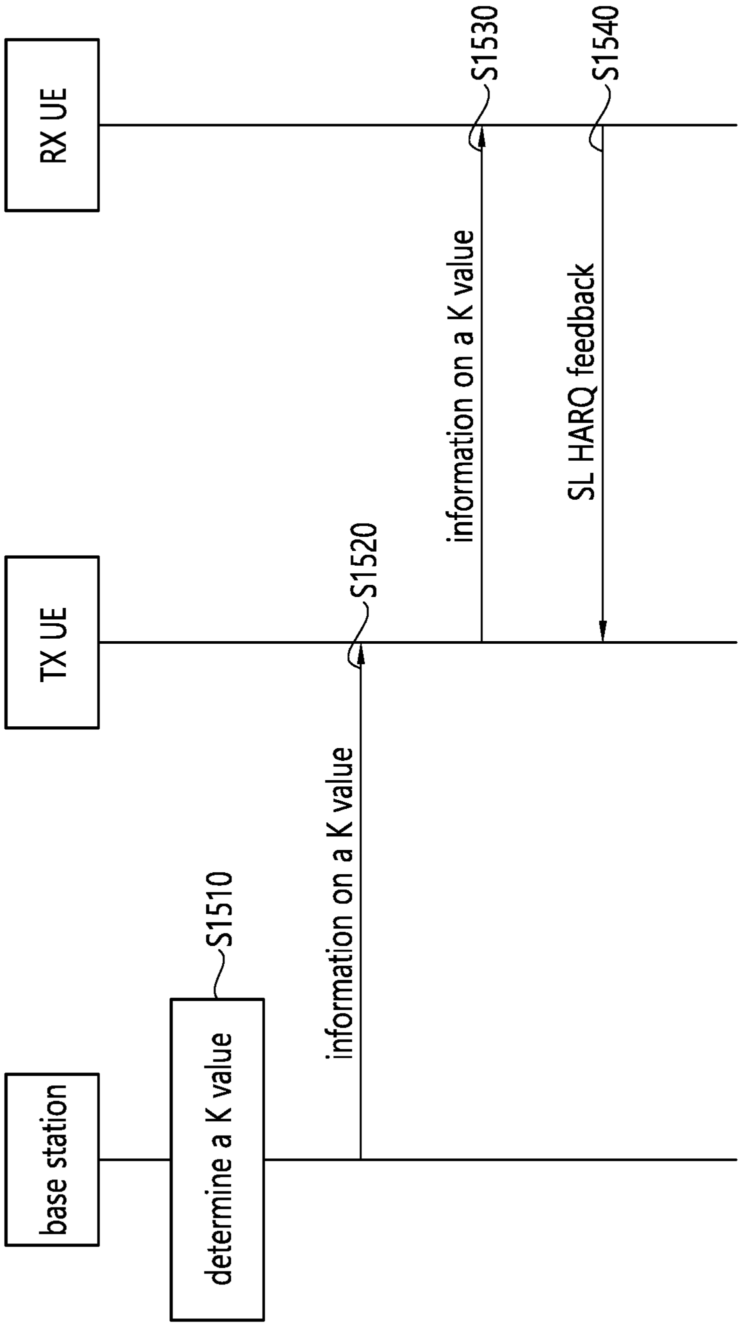
FIG. 15 shows a method for a base station to determine a K value, according to an embodiment of the present disclosure.

FIG. 15 shows a method for a base station to determine a K value, according to an embodiment of the present disclosure. The embodiment of FIG. 15 may be combined with various embodiments of the present disclosure.

Referring to FIG. 15, in step S1510, a base station may determine or configure a K value. For example, considering a PSCCH and/or second SCI transmitted by a TX UE, a base station may determine or configure a K value. A specific method for a base station to determine or configure a K value will be described later.

In step S1520, a base station may transmit information on a K value to a TX UE. For example, a base station may configure a K value to a TX UE, or configure it in advance. For example, a base station may transmit information on a K value to a TX UE through DCI.

In step S1530, a TX UE may transmit information on a K value to an RX UE. For example, a TX UE may transmit information on a K value to an RX UE through SCI. In addition, for example, a TX UE may transmit sidelink information to an RX UE.

In step S1540, an RX UE may transmit SL HARQ feedback information corresponding to the sidelink information to a TX UE. For example, upon receiving sidelink information from a TX UE in slot #N, an RX UE may transmit HARQ feedback information corresponding to the sidelink information to the TX UE in slot #(N+K) or a later slot. For example, if a PSFCH resource is in slot #(N+K), an RX UE may transmit SL HARQ feedback information corresponding to the sidelink information to a TX UE using a PSFCH resource on slot #(N+K). For example, if a PSFCH resource is not in slot #(N+K), an RX UE may transmit SL HARQ feedback information corresponding to the sidelink information to a TX UE, using a PSFCH resource on the earliest slot with a PSFCH resource after slot #(N+K).

Figure 16:
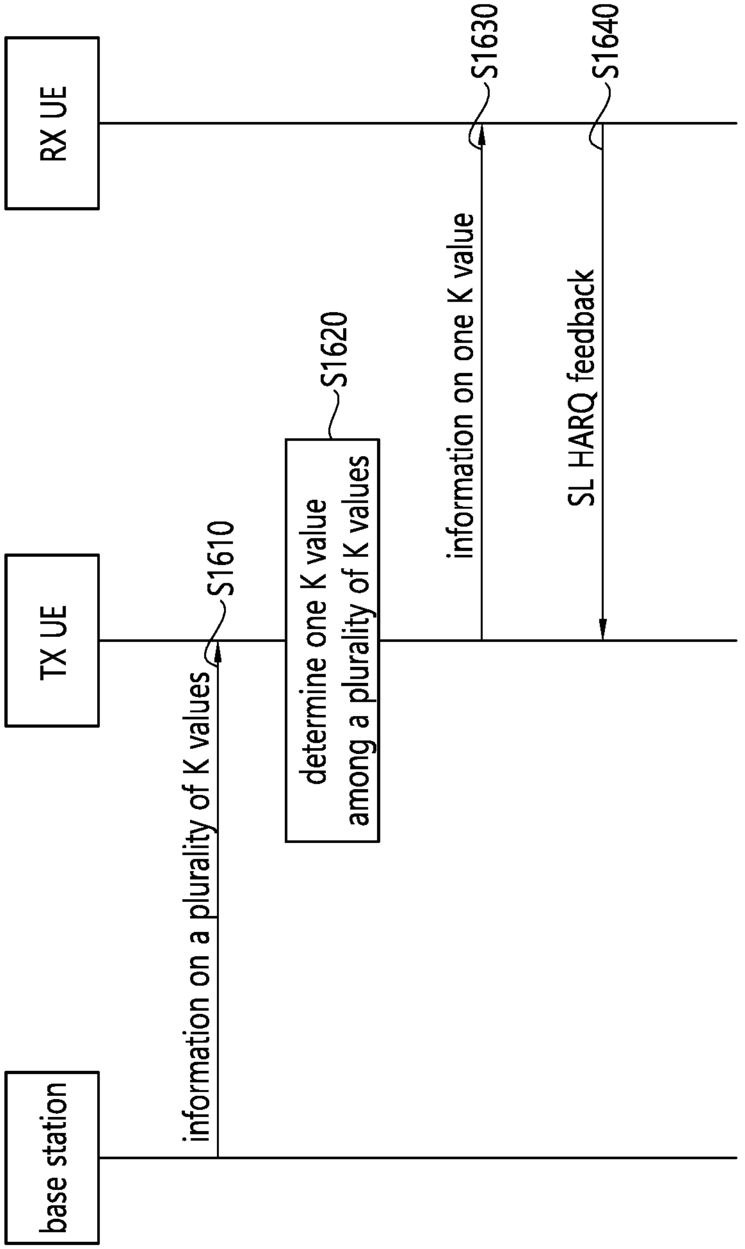
FIG. 16 shows a method for a UE to determine a K value, according to an embodiment of the present disclosure.

FIG. 16 shows a method for a UE to determine a K value, according to an embodiment of the present disclosure. The embodiment of FIG. 16 may be combined with various embodiments of the present disclosure.

Referring to FIG. 16, in step S1610, a base station may transmit information on a plurality of K values to a TX UE.

In step S1620, a TX UE may determine or configure one K value among a plurality of K values. For example, considering a PSCCH and/or second SCI transmitted by a TX UE, a TX UE may determine or configure one K value. A specific method for a TX UE to determine or configure one K value will be described later.

In step S1630, a TX UE may transmit information on one K value to an RX UE. For example, a TX UE may transmit information on one K value to an RX UE through SCI. In addition, for example, a TX UE may transmit sidelink information to an RX UE.

In step S1640, an RX UE may transmit SL HARQ feedback information corresponding to the sidelink information to a TX UE. For example, upon receiving sidelink information from a TX UE in slot #N, an RX UE may transmit HARQ feedback information corresponding to the sidelink information to the TX UE in slot #(N+K) or a later slot. For example, if a PSFCH resource is in slot #(N+K), an RX UE may transmit SL HARQ feedback information corresponding to the sidelink information to a TX UE using a PSFCH resource on slot #(N+K). For example, if a PSFCH resource is not in slot #(N+K), an RX UE may transmit SL HARQ feedback information corresponding to the sidelink information to a TX UE, using a PSFCH resource on the earliest slot with PSFCH resource after slot #(N+K).

Figure 17:
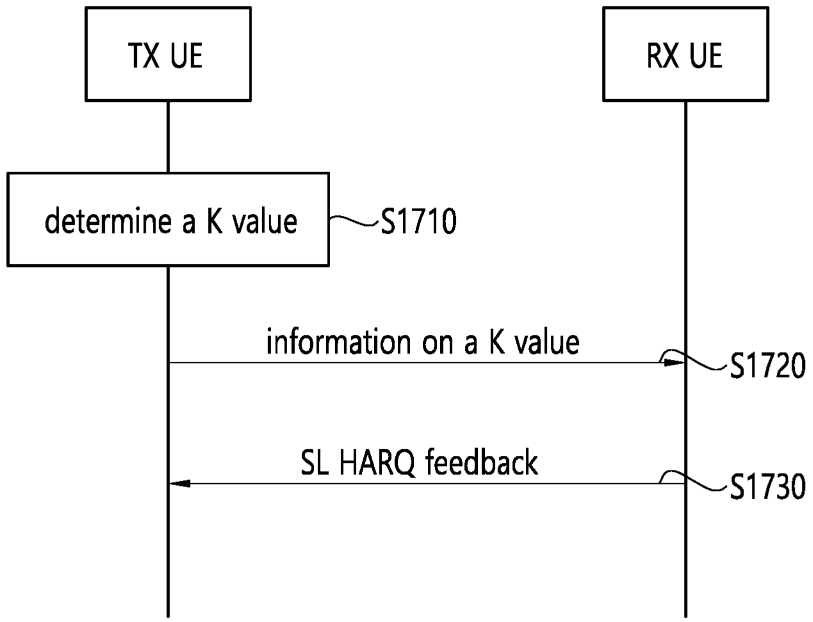
FIG. 17 shows a method for a UE to determine a K value, according to an embodiment of the present disclosure.

FIG. 17 shows a method for a UE to determine a K value, according to an embodiment of the present disclosure. The embodiment of FIG. 17 may be combined with various embodiments of the present disclosure.

Referring to FIG. 17, in step S1710, a TX UE may determine or configure a K value. For example, considering a PSCCH and/or second SCI transmitted by a TX UE, a TX UE may determine or configure a K value. A specific method for a TX UE to determine or configure a K value will be described later.

In step S1720, a TX UE may transmit information on a K value to an RX UE. For example, a TX UE may transmit information on a K value to an RX UE through SCI. In addition, for example, a TX UE may transmit sidelink information to an RX UE.

In step S1730, an RX UE may transmit SL HARQ feedback information corresponding to the sidelink information to a TX UE. For example, upon receiving sidelink information from a TX UE in slot #N, an RX UE may transmit HARQ feedback information corresponding to the sidelink information to the TX UE in slot #(N+K) or a later slot. For example, if a PSFCH resource is in slot #(N+K), an RX UE may transmit SL HARQ feedback information corresponding to the sidelink information to a TX UE using a PSFCH resource on slot #(N+K). For example, if a PSFCH resource is not in slot #(N+K), an RX UE may transmit SL HARQ feedback information corresponding to the sidelink information to a TX UE, using a PSFCH resource on the earliest slot with a PSFCH resource after slot #(N+K).

Hereinafter, a method in which a K value is determined or configured according to an embodiment of the present disclosure will be described in detail.

According to an embodiment of the present disclosure, according to at least one of the length of the time domain of a PSCCH, the location of a PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH, a K value may be configured or determined differently or independently.

And/or, for example, according to at least one of the length of the time domain of a PSCCH, the location of a PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH, a K value may be configured or determined differently or independently, per resource pool.

And/or, for example, according to at least one of the length of the time domain of a PSCCH, the location of a PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH, a K value may be configured or determined differently or independently, per service type.

And/or, for example, according to at least one of the length of the time domain of a PSCCH, the location of a PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH, a K value may be configured or determined differently or independently, per service priority.

And/or, for example, according to at least one of the length of the time domain of a PSCCH, the location of a PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH, a K value may be configured or determined differently or independently, per cast type.

And/or, for example, according to at least one of the length of the time domain of a PSCCH, the location of a PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH, a K value may be configured or determined differently or independently, per destination UE.

And/or, for example, according to at least one of the length of the time domain of a PSCCH, the location of a PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH, a K value may be configured or determined differently or independently, per (L1 or L2) destination ID.

And/or, for example, according to at least one of the length of the time domain of a PSCCH, the location of a PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH, a K value may be configured or determined differently or independently, per (L1 or L2) source ID.

And/or, for example, according to at least one of the length of the time domain of a PSCCH, the location of a PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH, a K value may be configured or determined differently or independently, per QoS parameter.

And/or, for example, according to at least one of the length of the time domain of a PSCCH, the location of a PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH, a K value may be configured or determined differently or independently, per (resource pool) congestion level.

And/or, for example, according to at least one of the length of the time domain of a PSCCH, the location of a PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH, a K value may be configured or determined differently or independently, per mode type.

And/or, for example, according to at least one of the length of the time domain of a PSCCH, the location of a PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH, a K value may be configured or determined differently or independently, per a numerology.

In the present disclosure, for example, the length of the time domain of the PSCCH may be the length of the time domain for a PSCCH in slot, allowed/configured for a UE in a resource pool. For example, the length of the time domain of the PSCCH may be the minimum length of the time domain for PSCCH in a slot, allowed/configured for a UE in a resource pool. For example, the length of the time domain of the PSCCH may be the maximum length of the time domain for PSCCH in a slot, allowed/configured for a UE in a resource pool. For example, the location of the PSCCH may be the location of a resource for a PSCCH in a slot, allowed/configured for a UE in a resource pool. For example, the location of a start symbol of the PSCCH may be the location of a start symbol for a PSCCH in a slot, allowed/configured for a UE in a resource pool. For example, the location of the last symbol of the PSCCH may be the location of the last symbol for a PSCCH in a slot, allowed/configured for a UE in a resource pool.

In the present disclosure, for example, the number of symbols to which the second SCI is mapped may be the number of symbols to which second SCI is mapped in a slot, allowed/configured for a UE in a resource pool. For example, the number of symbols to which the second SCI is mapped may be the minimum number of symbols to which second SCI is mapped in a slot, allowed/configured for a UE in a resource pool. For example, the number of symbols to which the second SCI is mapped may be the maximum number of symbols to which second SCI is mapped in a slot, allowed/configured for a UE in a resource pool. For example, the location to which the second SCI is mapped may be a location of a resource to which second SCI is mapped in a slot, allowed/configured for a UE in a resource pool. For example, the location of a start symbol to which the second SCI is mapped may be the location of a start symbol to which second SCI is mapped in a slot, allowed/configured for a UE in a resource pool. For example, the location of the last symbol to which the second SCI is mapped may be the location of the last symbol to which second SCI is mapped in a slot, allowed/configured for a UE in a resource pool.

In the present disclosure, for example, the length of the time domain of the PSSCH may be the length of the time domain for PSSCH in a slot, allowed/configured for a UE in a resource pool. For example, the length of the time domain of the PSSCH may be the minimum length of the time domain for PSSCH in a slot, allowed/configured for a UE in a resource pool. For example, the length of the time domain of the PSSCH may be the maximum length of the time domain for PSSCH in a slot, allowed/configured for a UE in a resource pool. For example, the location of the PSSCH may be the location of a resource for PSSCH in a slot, allowed/configured for a UE in a resource pool. For example, the location of a start symbol of the PSSCH may be the location of a start symbol for PSSCH in a slot, allowed/configured for a UE in a resource pool. For example, the location of the last symbol of the PSSCH may be the location of the last symbol for PSSCH in a slot, allowed/configured for a UE in a resource pool.

Here, for example, according to the above-described embodiment, according to at least one of the length of the time domain of a PSCCH, the location of a PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH, candidates/ranges of (minimum or maximum) K values that can be configured may be limited.

According to an embodiment of the present disclosure, as the length of the time domain of PSCCH is longer, a K value can be determined or configured to be relatively large. And/or, for example, as a start symbol of PSCCH and/or the last symbol of PSCCH is positioned later in a slot, a K value can be determined or configured to be relatively large.

And/or, for example, as the number of symbols to which second SCI is mapped increases, a K value can be determined or configured to be relatively large. And/or, for example, as a start symbol to which second SCI is mapped and/or the last symbol to which second SCI is mapped are located later in a slot, a K value can be determined or configured to be relatively large. And/or, for example, as the length of the time domain of PSSCH is longer, a K value can be determined or configured to be relatively large. And/or, for example, as a start symbol of PSSCH and/or the last symbol of PSSCH is positioned later in a slot, a K value can be determined or configured to be relatively large.

Alternatively, for example, a K value may be configured in common, regardless of the length of the time domain of a PSCCH, the location of the PSCCH, the location of a start symbol of a PSCCH, the location of the last symbol of a PSCCH, the number of symbols to which second SCI is mapped, the location to which second SCI is mapped, the location of a start symbol to which second SCI is mapped, the location of the last symbol to which second SCI is mapped, the length of the time domain of a PSSCH, the location of a PSSCH, the location of a start symbol of a PSSCH, and/or the location of the last symbol of a PSSCH.

According to an embodiment of the present disclosure, according to at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH, a K value may be configured or determined differently or independently. For example, according to at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH, a K value may be configured or determined differently or independently, per resource pool. And/or, for example, according to at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH, a K value may be configured or determined differently or independently, per service type. And/or, for example, according to at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH, a K value may be configured or determined differently or independently, per service priority. And/or, for example, according to at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH, a K value may be configured or determined differently or independently, per cast type. And/or, for example, according to at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH, a K value may be configured or determined differently or independently, per destination UE. And/or, for example, according to at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH, a K value may be configured or determined differently or independently, per (L1 or L2) destination ID. And/or, for example, according to at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH, a K value may be configured or determined differently or independently, per (L1 or L2) source ID. And/or, for example, according to at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH, a K value may be configured or determined differently or independently, per QoS parameter. And/or, for example, according to at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH, a K value may be configured or determined differently or independently, per (resource pool) congestion level. And/or, for example, according to at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH, a K value may be configured or determined differently or independently, per mode type. And/or, for example, according to at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH, a K value may be configured or determined differently or independently, per a numerology.

According to an embodiment of the present disclosure, according to at least one of the location of a PSCCH DMRS on a slot related to a PSCCH, the location of the first PSCCH DMRS on a slot related to a PSCCH, the location of the last PSCCH DMRS on a slot related to a PSCCH, and/or the number of PSCCH DMRSs on a slot related to a PSCCH, a K value may be configured or determined differently or independently. For example, according to at least one of the location of a PSCCH DMRS on a slot related to a PSCCH, the location of the first PSCCH DMRS on a slot related to a PSCCH, the location of the last PSCCH DMRS on a slot related to a PSCCH, and/or the number of PSCCH DMRSs on a slot related to a PSCCH, a K value may be configured or determined differently or independently, per resource pool. And/or, for example, according to at least one of the location of a PSCCH DMRS on a slot related to a PSCCH, the location of the first PSCCH DMRS on a slot related to a PSCCH, the location of the last PSCCH DMRS on a slot related to a PSCCH, and/or the number of PSCCH DMRSs on a slot related to a PSCCH, a K value may be configured or determined differently or independently, per service type. And/or, for example, according to at least one of the location of a PSCCH DMRS on a slot related to a PSCCH, the location of the first PSCCH DMRS on a slot related to a PSCCH, the location of the last PSCCH DMRS on a slot related to a PSCCH, and/or the number of PSCCH DMRSs on a slot related to a PSCCH, a K value may be configured or determined differently or independently, per service priority. And/or, for example, according to at least one of the location of a PSCCH DMRS on a slot related to a PSCCH, the location of the first PSCCH DMRS on a slot related to a PSCCH, the location of the last PSCCH DMRS on a slot related to a PSCCH, and/or the number of PSCCH DMRSs on a slot related to a PSCCH, a K value may be configured or determined differently or independently, per cast type. And/or, for example, according to at least one of the location of a PSCCH DMRS on a slot related to a PSCCH, the location of the first PSCCH DMRS on a slot related to a PSCCH, the location of the last PSCCH DMRS on a slot related to a PSCCH, and/or the number of PSCCH DMRSs on a slot related to a PSCCH, a K value may be configured or determined differently or independently, per destination UE. And/or, for example, according to at least one of the location of a PSCCH DMRS on a slot related to a PSCCH, the location of the first PSCCH DMRS on a slot related to a PSCCH, the location of the last PSCCH DMRS on a slot related to a PSCCH, and/or the number of PSCCH DMRSs on a slot related to a PSCCH, a K value may be configured or determined differently or independently, per (L1 or L2) destination ID. And/or, for example, according to at least one of the location of a PSCCH DMRS on a slot related to a PSCCH, the location of the first PSCCH DMRS on a slot related to a PSCCH, the location of the last PSCCH DMRS on a slot related to a PSCCH, and/or the number of PSCCH DMRSs on a slot related to a PSCCH, a K value may be configured or determined differently or independently, per (L1 or L2) source ID. And/or, for example, according to at least one of the location of a PSCCH DMRS on a slot related to a PSCCH, the location of the first PSCCH DMRS on a slot related to a PSCCH, the location of the last PSCCH DMRS on a slot related to a PSCCH, and/or the number of PSCCH DMRSs on a slot related to a PSCCH, a K value may be configured or determined differently or independently, per QoS parameter. And/or, for example, according to at least one of the location of a PSCCH DMRS on a slot related to a PSCCH, the location of the first PSCCH DMRS on a slot related to a PSCCH, the location of the last PSCCH DMRS on a slot related to a PSCCH, and/or the number of PSCCH DMRSs on a slot related to a PSCCH, a K value may be configured or determined differently or independently, per (resource pool) congestion level. And/or, for example, according to at least one of the location of a PSCCH DMRS on a slot related to a PSCCH, the location of the first PSCCH DMRS on a slot related to a PSCCH, the location of the last PSCCH DMRS on a slot related to a PSCCH, and/or the number of PSCCH DMRSs on a slot related to a PSCCH, a K value may be configured or determined differently or independently, per mode type. And/or, for example, according to at least one of the location of a PSCCH DMRS on a slot related to a PSCCH, the location of the first PSCCH DMRS on a slot related to a PSCCH, the location of the last PSCCH DMRS on a slot related to a PSCCH, and/or the number of PSCCH DMRSs on a slot related to a PSCCH, a K value may be configured or determined differently or independently, per a numerology.

Here, for example, according to at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH, the channel estimation start time and/or the channel estimation end time required for a UE to decode a PSSCH may be changed. That is, at least one of the location of a PSSCH DMRS on a slot related to a PSSCH, the location of the first PSSCH DMRS on a slot related to a PSSCH, the location of the last PSSCH DMRS on a slot related to a PSSCH, and/or the number of PSSCH DMRSs on a slot related to a PSSCH may affect the PSSCH decoding start time and/or PSSCH decoding completion time of a UE. And/or, for example, according to at least one of the location of a PSSCH DMRS on a slot related to a PSCCH, the location of the first PSSCH DMRS on a slot related to a PSCCH, the location of the last PSSCH DMRS on a slot related to a PSCCH, and/or the number of PSSCH DMRSs on a slot related to a PSCCH, the channel estimation start time and/or the channel estimation end time required for a UE to decode a PSSCH may be changed. That is, at least one of the location of a PSSCH DMRS on a slot related to a PSCCH, the location of the first PSSCH DMRS on a slot related to a PSCCH, the location of the last PSSCH DMRS on a slot related to a PSCCH, and/or the number of PSSCH DMRSs on a slot related to a PSCCH may affect the PSSCH decoding start time and/or PSSCH decoding completion time of a UE.

For example, as the first PSSCH DMRS is positioned later in a slot, on a slot related to PSSCH, a start time of channel estimation and/or an end time of channel estimation required for a UE to decode a PSSCH may be delayed, and a time at which a UE starts and/or ends a decoding of a PSSCH may be delayed. For example, as the last PSSCH DMRS is positioned later in a slot, on a slot related to PSSCH, a start time of channel estimation and/or an end time of channel estimation required for a UE to decode a PSSCH may be delayed, and a time at which a UE starts and/or ends a decoding of a PSSCH may be delayed. For example, as the first PSSCH DMRS is located later in a slot, on a slot related to PSCCH, a start time of channel estimation and/or an end time of channel estimation required for a UE to decode a PSSCH may be delayed, and a time at which a UE starts and/or ends a decoding of a PSSCH may be delayed. For example, as the last PSSCH DMRS is located later in a slot, on a slot related to PSCCH, a start time of channel estimation and/or an end time of channel estimation required for a UE to decode a PSSCH may be delayed, and a time at which a UE starts and/or ends a decoding of a PSSCH may be delayed.

Therefore, for example, as the first PSSCH DMRS is positioned later in a slot, on a slot related to PSSCH, a K value can be determined or configured to be relatively large. And/or, for example, as the last PSSCH DMRS is positioned later in a slot, on a slot related to PSSCH, a K value can be determined or configured to be relatively large. And/or, for example, as the number of PSSCH DMRSs in a slot related to PSSCH is smaller, a K value can be determined or configured to be relatively large. And/or, for example, as the first PSSCH DMRS is located later in a slot, on a slot related to PSCCH, a K value can be determined or configured to be relatively large. And/or, for example, as the last PSSCH DMRS is located later in a slot, on a slot related to PSCCH, a K value can be determined or configured to be relatively large. And/or, for example, as the number of PSSCH DMRSs in a slot related to PSCCH is smaller, a K value can be determined or configured to be relatively large.

According to an embodiment of the present disclosure, according to the location where the last symbol and/or a start symbol related to PSSCH on a PSSCH slot is configured and a location where a start symbol and/or the last symbol related to a PSFCH on a PSFCH slot is configured, a K value that can guarantee the (specific) (minimum) processing time of a (pre-configured) UE may be different. And/or, for example, according to the location where the last symbol and/or a start symbol related to PSCCH on a PSCCH slot is configured and a location where a start symbol and/or the last symbol related to a PSFCH on a PSFCH slot is configured, a K value that can guarantee the (specific) (minimum) processing time of a (pre-configured) UE may be different. And/or, for example, according to the length of a time resource and/or the number of symbols related to a PSSCH and the length of a time resource and/or the number of symbols related to PSFCH, a K value that can guarantee the (specific) (minimum) processing time of a (pre-configured) UE may be different. And/or, for example, according to the length of a time resource and/or the number of symbols related to a PSCCH and the length of a time resource and/or the number of symbols related to PSFCH, a K value that can guarantee the (specific) (minimum) processing time of a (pre-configured) UE may be different.

And/or, for example, according to the number of symbols to which second SCI is mapped on a PSSCH slot and the location where a start symbol and/or the last symbol related to a PSFCH on a PSFCH slot are configured, a K value that can guarantee the (specific) (minimum) processing time of a (pre-configured) UE may be different. And/or, for example, according to the number of symbols to which second SCI is mapped on a PSSCH slot, the length of a time resource and/or the number of symbols related to a PSFCH on a PSFCH slot, a K value that can guarantee the (specific) (minimum) processing time of a (pre-configured) UE may be different.

And/or, for example, according to the number of symbols to which second SCI is mapped on a PSCCH slot and the location where a start symbol and/or the last symbol related to a PSFCH on a PSFCH slot are configured, a K value that can guarantee the (specific) (minimum) processing time of a (pre-configured) UE may be different. And/or, for example, according to the number of symbols to which second SCI is mapped on a PSCCH slot, the length of a time resource and/or the number of symbols related to a PSFCH on a PSFCH slot, a K value that can guarantee the (specific) (minimum) processing time of a (pre-configured) UE may be different.

And/or, for example, according to the location where a start symbol and/or the last symbol related to second SCI on a PSSCH slot are configured and the location where a start symbol and/or the last symbol related to a PSFCH on a PSFCH slot are configured, a K value that can guarantee the (specific) (minimum) processing time of a (pre-configured) UE may be different. And/or, for example, according to the location where a start symbol and/or the last symbol related to second SCI on a PSSCH slot are configured, and the length of a time resource and/or the number of symbols related to PSFCH, a K value that can guarantee the (specific) (minimum) processing time of a (pre-configured) UE may be different.

And/or, for example, according to the location where a start symbol and/or the last symbol related to second SCI on a PSCCH slot are configured and the location where a start symbol and/or the last symbol related to a PSFCH on a PSFCH slot are configured, a K value that can guarantee the (specific) (minimum) processing time of a (pre-configured) UE may be different. And/or, for example, according to the location where a start symbol and/or the last symbol related to second SCI on a PSCCH slot are configured, and the length of a time resource and/or the number of symbols related to PSFCH, a K value that can guarantee the (specific) (minimum) processing time of a (pre-configured) UE may be different.

Here, for example, for convenience of explanation, a case in which the last symbol and/or a start symbol related to PSSCH/PSCCH on a PSSCH/PSCCH slot is located (relatively) later, and a start symbol and/or the last symbol related to PSFCH on a PSFCH slot are located (relatively) earlier may be referred to as CASE A. And/or, for example, a case in which the last symbol and/or a start symbol related to second SCI on a PSSCH/PSCCH slot is located (relatively) later, and a start symbol and/or the last symbol related to PSFCH on a PSFCH slot are located (relatively) earlier may be referred to as CASE A. And/or, for example, a case in which the length of a time resource related to PSFCH on a PSFCH slot is (relatively) long may be referred to as CASE A. And/or, for example, a case in which the length of a time resource related to PSSCH/PSCCH on a PSSCH/PSCCH slot is (relatively) long may be referred to as CASE A. And/or, for example, a case in which the length of a time resource related to second SCI on a PSSCH/PSCCH slot is (relatively) long may be referred to as CASE A. For example, a (relatively) long time resource length may mean a (relatively) large number of symbols.

For example, for convenience of explanation, a case in which the last symbol and/or a start symbol related to PSSCH/PSCCH on a PSSCH/PSCCH slot is located (relatively) earlier, and a start symbol and/or the last symbol related to PSFCH on a PSFCH slot are located (relatively) later may be referred to as CASE B. And/or, for example, a case in which the last symbol and/or a start symbol related to second SCI on a PSSCH/PSCCH slot is located (relatively) earlier, and a start symbol and/or the last symbol related to PSFCH on a PSFCH slot is located (relatively) later may be referred to as CASE B. And/or, for example, a case in which the length of a time resource related to PSFCH on a PSFCH slot is (relatively) short may be referred to as CASE B. And/or, for example, a case in which the length of a time resource related to PSSCH/PSCCH on a PSSCH/PSCCH slot is (relatively) short may be referred to as CASE B. And/or, for example, a case in which the length of a time resource related to second SCI on a PSSCH/PSCCH slot is (relatively) short may be referred to as CASE B. For example, the (relatively) short length of a time resource may mean a (relatively) small number of symbols.

Figure 18:
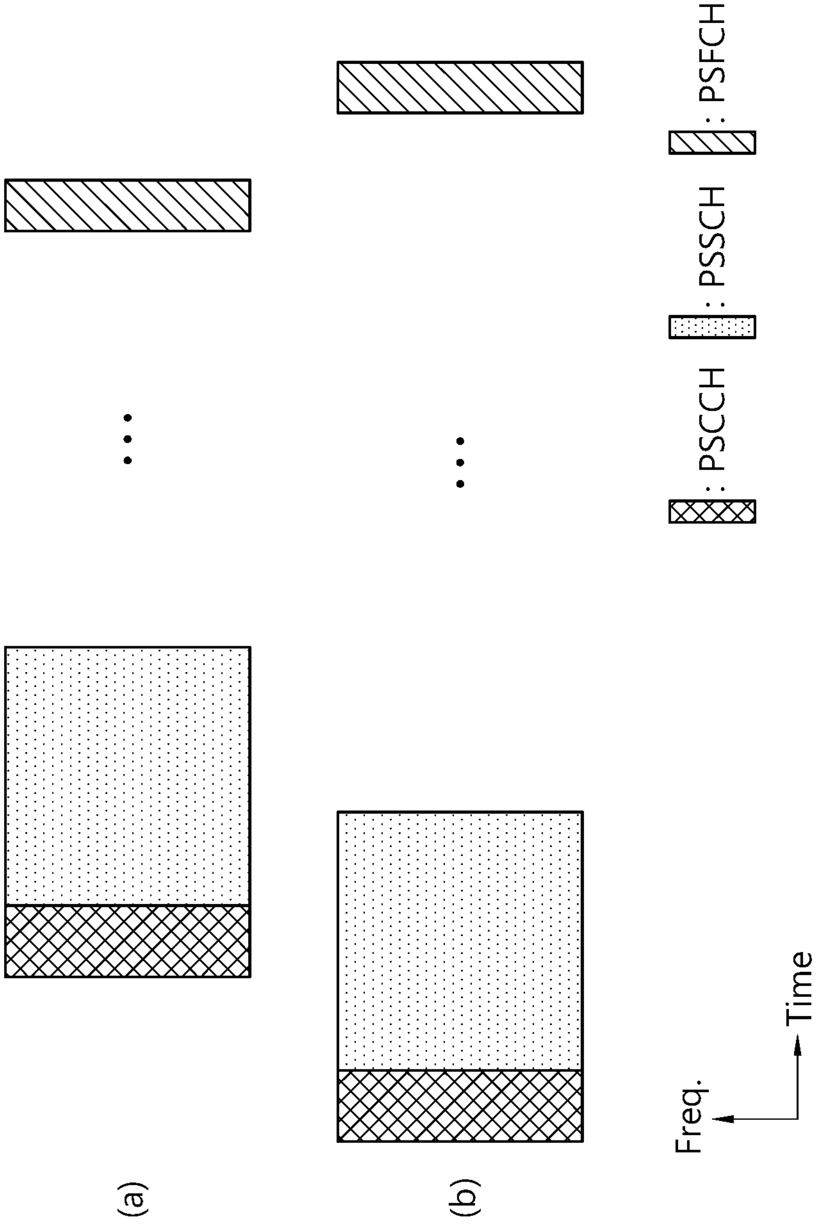
FIG. 18 shows CASE A and CASE B according to an embodiment of the present disclosure.

FIG. 18 shows CASE A and CASE B according to an embodiment of the present disclosure. The embodiment of FIG. 18 may be combined with various embodiments of the present disclosure. Specifically, (a) of FIG. 18 shows an example of CASE A, (b) of FIG. 16 shows an example of CASE B.

For example, in CASE A, a K value for guaranteeing the (minimum) processing time of a (pre-configured) UE may be configured relatively large. For example, compared with a K value to ensure the (minimum) processing time of a UE in CASE B, in CASE A, a K value for guaranteeing the (minimum) processing time of a (pre-configured) UE may be configured relatively large. In other words, even with the same K value, according to the location where the last symbol and/or a start symbol related to PSSCH/PSCCH on a PSSCH/PSCCH slot is configured and the location where a start symbol and/or the last symbol related to a PSFCH on a PSFCH slot is configured, whether to guarantee the (specific) (minimum) processing time of a (pre-configured) UE may be different. And/or, for example, even with the same K value, according to the location where the last symbol and/or the start symbol related to second SCI on a PSSCH/PSCCH slot is configured and the location where a start symbol and/or the last symbol related to PSFCH on a PSFCH slot is configured, whether to guarantee the (specific) (minimum) processing time of a (pre-configured) UE may be different. And/or, for example, even with the same K value, according to the length of a time resource related to PSFCH configured on a PSFCH slot, whether to guarantee the (specific) (minimum) processing time of a (pre-configured) UE may be different. And/or, for example, even with the same K value, according to the length of a time resource related to PSSCH/PSCCH configured on a PSSCH/PSCCH slot, whether to guarantee the (specific) (minimum) processing time of a (pre-configured) UE may be different. And/or, for example, even with the same K value, according to the length of a time resource related to second SCI configured on a PSSCH/PSCCH slot, whether to guarantee the (specific) (minimum) processing time of a (pre-configured) UE may be different. For example, the length of a configured time resource may be the number of configured symbols.

Considering this, for example, a K value may be configured (restrictively) so that the (minimum) processing time of the (pre-configured) UE is guaranteed, based on the minimum (time) interval between the location where the last symbol and/or a start symbol related to PSSCH/PSCCH on an allowed/configured a PSSCH/PSCCH slot in a resource pool is configured and the location where a start symbol and/or the last symbol related to PSFCH on a PSFCH slot is configured. And/or, for example, a K value may be configured (restrictively) so that the (minimum) processing time of the (pre-configured) UE is guaranteed, based on the minimum (time) interval between the location where the last symbol and/or a start symbol related to second SCI on an allowed/configured PSSCH/PSCCH slot in a resource pool is configured and the location where a start symbol and/or the last symbol related to PSFCH on a PSFCH slot is configured. And/or, for example, a K value may be configured (restrictively) so that the (minimum) processing time of the (pre-configured) UE is guaranteed, based on the length of a time resource related to PSFCH configured on an allowed/configured PSFCH slot in a resource pool. And/or, for example, a K value may be configured (restrictively) so that the (minimum) processing time of the (pre-configured) UE is guaranteed, based on the length of a time resource related to PSSCH/PSCCH configured on an allowed/configured PSSCH/PSCCH slot in a resource pool. And/or, for example, a K value may be configured (restrictively) so that the (minimum) processing time of the (pre-configured) UE is guaranteed, based on the length of a time resource related to second SCI configured on an allowed/configured PSSCH/PSCCH slot in a resource pool. For example, the length of a configured time resource may be the number of configured symbols.

According to various embodiments of the present disclosure, a K value may be configured based on a PSCCH resource, a resource to which second SCI is mapped, and/or a PSSCH DMRS location, and etc. Accordingly, a TX UE that has transmitted sidelink information to an RX UE can efficiently receive SL HARQ feedback information corresponding to the sidelink information from the RX UE.

Figure 19:
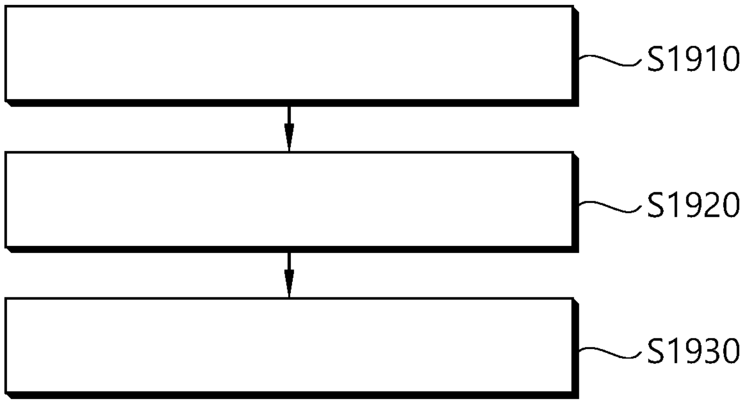
FIG. 19 shows a method for a first device to perform wireless communication, according to an embodiment of the present disclosure.

FIG. 19 shows a method for a first apparatus to perform wireless communication, according to an embodiment of the present disclosure. The embodiment of FIG. 19 may be combined with various embodiments of the present disclosure.

Referring to FIG. 19, in step S1910, a first apparatus may receive a physical sidelink control channel (PSCCH) from a second apparatus. In step S1920, a first apparatus may receive a physical sidelink shared channel (PSSCH) related to the PSCCH from the second apparatus. In step S1930, a first apparatus may determine a physical sidelink feedback channel (PSFCH) resource related to the PSSCH, based on an index of a slot related to the PSSCH and an index of a subchannel related to the PSSCH. In step S1940, a first apparatus may transmit hybrid automatic repeat request (HARQ) feedback information for the PSSCH to the second apparatus on the PSFCH resource. For example, the PSSCH may be received on a first slot which is the Nth slot, the HARQ feedback information may be transmitted on a second slot which includes the PSFCH resource, among the N+Kth slot and slots after the N+Kth slot, the N value and the K value may be zero or positive integers, and the K value may be configured based on at least one of a PSCCH resource, a PSSCH resource, or the PSFCH resource, configured for a resource pool.

For example, a K value configured in a case in which the number of symbols of the PSCCH resource is large may be greater than a K value configured in a case in which the number of symbols of the PSCCH resource is small. For example, the number of symbols of the PSCCH resource may be configured per resource pool.

For example, a K value configured in a case in which the PSCCH resource is included in the second half of the first slot may be greater than a K value configured in a case in which the PSCCH resource is included in the first half of the first slot. For example, the location of the PSCCH resource in the first slot may be configured for each resource pool.

For example, a K value configured in a case in which the number of symbols related to sidelink control information (SCI) mapped on the PSSCH resource is large may be greater than a K value configured in a case in which the number of symbols related to SCI mapped on the PSSCH resource is small.

For example, a K value configured in a case in which a symbol related to SCI mapped on the PSSCH resource is included in the second half of the first slot may be greater than a K value configured in a case in which a symbol related to SCI mapped on the PSSCH resource is included in the first half of the first slot.

For example, a K value configured in a case in which a symbol related to a demodulation reference signal (DMRS) mapped on the PSCCH resource or the PSSCH resource is included in the second half of the first slot may be greater than a K value configured in a case in which a symbol related to a DMRS mapped on the PSCCH resource or the PSSCH resource is included in the first half of the first slot.

For example, a K value configured in a case in which the number of symbols related to a DMRS mapped on the PSCCH resource or the PSSCH resource is small may be greater than a K value configured in a case in which the number of symbols related to a DMRS mapped on the PSCCH resource or the PSSCH resource is large.

For example, a K value configured in a case in which the PSSCH resource is included in the second half of the first slot and the PSFCH resource is included in the first half of the second a slot may be greater than a K value configured in a case in which the PSSCH resource is included in the first half of the first slot and the PSFCH resource is included in the second half of the second a slot.

For example, a K value configured in a case in which the number of symbols of the PSFCH resource is large may be greater than a K value configured in a case in which the number of symbols of the PSFCH resource is small.

For example, based on at least one of the PSFCH resource, the PSSCH resource, or the PSFCH resource, configured for the resource pool, a plurality of candidate K values or the range of a candidate K value may be configured, and the K value may be selected among the plurality of candidate K values or in the range of a candidate K value.

For example, the K value may be configured based on at least one of a resource pool, a service type, a service priority, or a cast type.

The proposed method may be applied to an apparatus according to various embodiments of the present disclosure. First, a processor 102 of a first apparatus 100 may control a transceiver 106 to receive a physical sidelink control channel (PSCCH) from a second apparatus 200. And, a processor 102 of a first apparatus 100 may control a transceiver 106 to receive a physical sidelink shared channel (PSSCH) related to the PSCCH from the second apparatus 200. And, a processor 102 of a first apparatus 100 may determine a physical sidelink feedback channel (PSFCH) resource related to the PSSCH, based on an index of a slot related to the PSSCH and an index of a subchannel related to the PSSCH. And, a processor 102 of a first apparatus 100 may control a transceiver 106 to transmit hybrid automatic repeat request (HARQ) feedback information for the PSSCH to the second apparatus 200 on the PSFCH resource. For example, the PSSCH may be received on a first slot which is the Nth slot, the HARQ feedback information may be transmitted on a second slot which includes the PSFCH resource, among the N+Kth slot and slots after the N+Kth slot, the N value and the K value may be zero or positive integers, and the K value may be configured based on at least one of a PSCCH resource, a PSSCH resource, or the PSFCH resource, configured for a resource pool.

According to an embodiment of the present disclosure, a first apparatus for performing wireless communication, may be proposed. For example, the first apparatus may comprise: one or more memories storing instructions; one or more transceivers; and one or more processors connected to the one or more memories and the one or more transceivers. For example, the one or more processors may execute the instructions to: receive a physical sidelink control channel (PSCCH) from a second apparatus; receive a physical sidelink shared channel (PSSCH) related to the PSCCH from the second apparatus; determine a physical sidelink feedback channel (PSFCH) resource related to the PSSCH, based on an index of a slot related to the PSSCH and an index of a subchannel related to the PSSCH; and transmit hybrid automatic repeat request (HARQ) feedback information for the PSSCH to the second apparatus on the PSFCH resource. For example, the PSSCH may be received on a first slot which is the Nth slot, the HARQ feedback information may be transmitted on a second slot which includes the PSFCH resource, among the N+Kth slot and slots after the N+Kth slot, the N value and the K value may be zero or positive integers, and the K value may be configured based on at least one of a PSCCH resource, a PSSCH resource, or the PSFCH resource, configured for a resource pool.

According to an embodiment of the present disclosure, an apparatus configured to control a first user equipment (UE) may be proposed. For example, the apparatus may comprise: one or more processors; and one or more memories operably connectable to the one or more processors and storing instructions. For example, the one or more processors may execute the instructions to: receive a physical sidelink control channel (PSCCH) from a second UE; receive a physical sidelink shared channel (PSSCH) related to the PSCCH from the second UE; determine a physical sidelink feedback channel (PSFCH) resource related to the PSSCH, based on an index of a slot related to the PSSCH and an index of a subchannel related to the PSSCH; and transmit hybrid automatic repeat request (HARQ) feedback information for the PSSCH to the second UE on the PSFCH resource. For example, the PSSCH may be received on a first slot which is the Nth slot, the HARQ feedback information may be transmitted on a second slot which includes the PSFCH resource, among the N+Kth slot and slots after the N+Kth slot, the N value and the K value may be zero or positive integers, and the K value may be configured based on at least one of a PSCCH resource, a PSSCH resource, or the PSFCH resource, configured for a resource pool.

According to an embodiment of the present disclosure, a non-transitory computer-readable storage medium storing instructions may be proposed. For example, the instructions, when executed, may cause a first apparatus to: receive a physical sidelink control channel (PSCCH) from a second apparatus; receive a physical sidelink shared channel (PSSCH) related to the PSCCH from the second apparatus; determine a physical sidelink feedback channel (PSFCH) resource related to the PSSCH, based on an index of a slot related to the PSSCH and an index of a subchannel related to the PSSCH; and transmit hybrid automatic repeat request (HARQ) feedback information for the PSSCH to the second apparatus on the PSFCH resource. For example, the PSSCH may be received on a first slot which is the Nth slot, the HARQ feedback information may be transmitted on a second slot which includes the PSFCH resource, among the N+Kth slot and slots after the N+Kth slot, the N value and the K value may be zero or positive integers, and the K value may be configured based on at least one of a PSCCH resource, a PSSCH resource, or the PSFCH resource, configured for a resource pool.

Figure 20:
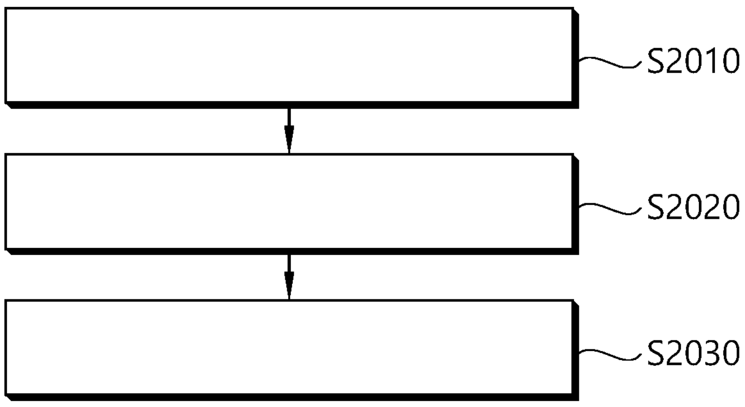
FIG. 20 shows a method for a second device to perform wireless communication, according to an embodiment of the present disclosure.

FIG. 20 shows a method for a second apparatus to perform wireless communication, according to an embodiment of the present disclosure. The embodiment of FIG. 20 may be combined with various embodiments of the present disclosure.

Referring to FIG. 20, in step S2010, a second apparatus may transmit a physical sidelink control channel (PSCCH) to a first apparatus. In step S2020, a second apparatus may transmit a physical sidelink shared channel (PSSCH) related to the PSCCH to the first apparatus. In step S2030, a second apparatus may determine a physical sidelink feedback channel (PSFCH) resource related to the PSSCH, based on an index of a slot related to the PSSCH and an index of a subchannel related to the PSSCH. In step S2040, a second apparatus may receive hybrid automatic repeat request (HARQ) feedback information for the PSSCH from the first apparatus on the PSFCH resource. For example, the PSSCH may be transmitted on a first slot which is the Nth slot, the HARQ feedback information may be received on a second slot which includes the PSFCH resource, among the N+Kth slot and slots after the N+Kth slot, the N value and the K value may be zero or positive integers, and the K value may be configured based on at least one of a PSCCH resource, a PSSCH resource, or the PSFCH resource, configured for a resource pool.

The proposed method may be applied to an apparatus according to various embodiments of the present disclosure. First, a processor 202 of a second apparatus 200 may control a transceiver 206 to transmit a physical sidelink control channel (PSCCH) to a first apparatus 100. And, a processor 202 of a second apparatus 200 may control a transceiver 206 to transmit a physical sidelink shared channel (PSSCH) related to the PSCCH to the first apparatus 100. And, a processor 202 of a second apparatus 200 may determine a physical sidelink feedback channel (PSFCH) resource related to the PSSCH, based on an index of a slot related to the PSSCH and an index of a subchannel related to the PSSCH. And, a processor 202 of a second apparatus 200 may control a transceiver 206 to receive hybrid automatic repeat request (HARQ) feedback information for the PSSCH from the first apparatus 100 on the PSFCH resource. For example, the PSSCH may be transmitted on a first slot which is the Nth slot, the HARQ feedback information may be received on a second slot which includes the PSFCH resource, among the N+Kth slot and slots after the N+Kth slot, the N value and the K value may be zero or positive integers, and the K value may be configured based on at least one of a PSCCH resource, a PSSCH resource, or the PSFCH resource, configured for a resource pool.

According to an embodiment of the present disclosure, a second apparatus for performing wireless communication may be proposed. For example, the second apparatus may comprise: one or more memories storing instructions; one or more transceivers; and one or more processors connected to the one or more memories and the one or more transceivers. For example, the one or more processors may execute the instructions to: transmit a physical sidelink control channel (PSCCH) to a first apparatus; transmit a physical sidelink shared channel (PSSCH) related to the PSCCH to the first apparatus; determine a physical sidelink feedback channel (PSFCH) resource related to the PSSCH, based on an index of a slot related to the PSSCH and an index of a subchannel related to the PSSCH; and receive hybrid automatic repeat request (HARQ) feedback information for the PSSCH from the first apparatus on the PSFCH resource. For example, the PSSCH may be transmitted on a first slot which is the Nth slot, the HARQ feedback information may be received on a second slot which includes the PSFCH resource, among the N+Kth slot and slots after the N+Kth slot, the N value and the K value may be zero or positive integers, and the K value may be configured based on at least one of a PSCCH resource, a PSSCH resource, or the PSFCH resource, configured for a resource pool.

According to an embodiment of the present disclosure, an apparatus configured to control a second user equipment (UE) may be proposed. For example, the apparatus may comprise: one or more processors; and one or more memories operably connectable to the one or more processors and storing instructions. For example, the one or more processors may execute the instructions to: transmit a physical sidelink control channel (PSCCH) to a first UE; transmit a physical sidelink shared channel (PSSCH) related to the PSCCH to the first UE; determine a physical sidelink feedback channel (PSFCH) resource related to the PSSCH, based on an index of a slot related to the PSSCH and an index of a subchannel related to the PSSCH. For example, the PSSCH may be transmitted on a first slot which is the Nth slot, the HARQ feedback information may be received on a second slot which includes the PSFCH resource, among the N+Kth slot and slots after the N+Kth slot, the N value and the K value may be zero or positive integers, and the K value may be configured based on at least one of a PSCCH resource, a PSSCH resource, or the PSFCH resource, configured for a resource pool.

According to an embodiment of the present disclosure, a non-transitory computer-readable storage medium storing instructions may be proposed. For example, the instructions, when executed, may cause a second apparatus to: transmit a physical sidelink control channel (PSCCH) to a first apparatus; transmit a physical sidelink shared channel (PSSCH) related to the PSCCH to the first apparatus; determine a physical sidelink feedback channel (PSFCH) resource related to the PSSCH, based on an index of a slot related to the PSSCH and an index of a subchannel related to the PSSCH; and receive hybrid automatic repeat request (HARQ) feedback information for the PSSCH from the first apparatus on the PSFCH resource. For example, the PSSCH may be transmitted on a first slot which is the Nth slot, the HARQ feedback information may be received on a second slot which includes the PSFCH resource, among the N+Kth slot and slots after the N+Kth slot, the N value and the K value may be zero or positive integers, and the K value may be configured based on at least one of a PSCCH resource, a PSSCH resource, or the PSFCH resource, configured for a resource pool.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
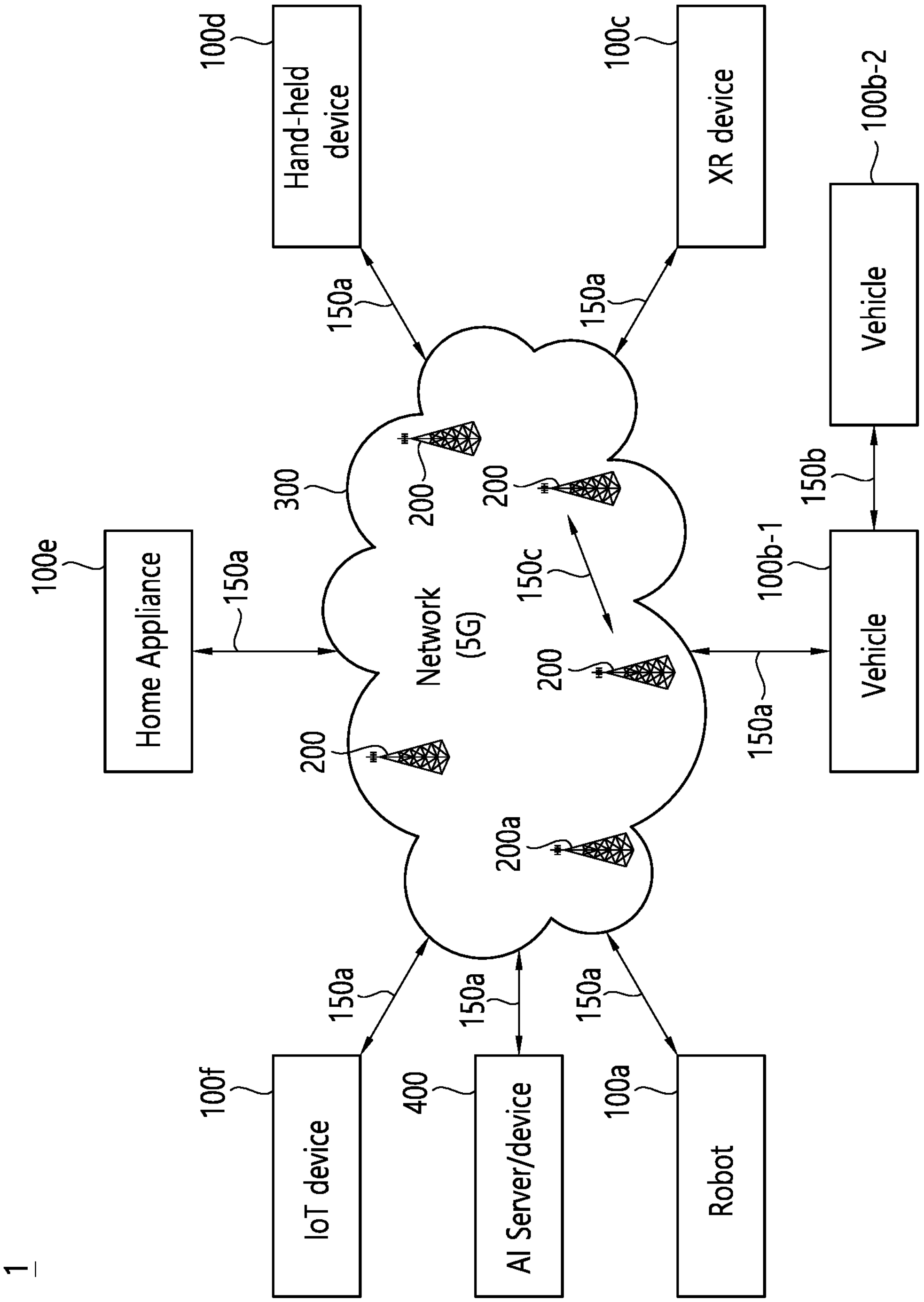
FIG. 21 shows a communication system 1, based on an embodiment of the present disclosure.

FIG. 21 shows a communication system 1, based on an embodiment of the present disclosure.

Referring to FIG. 21, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
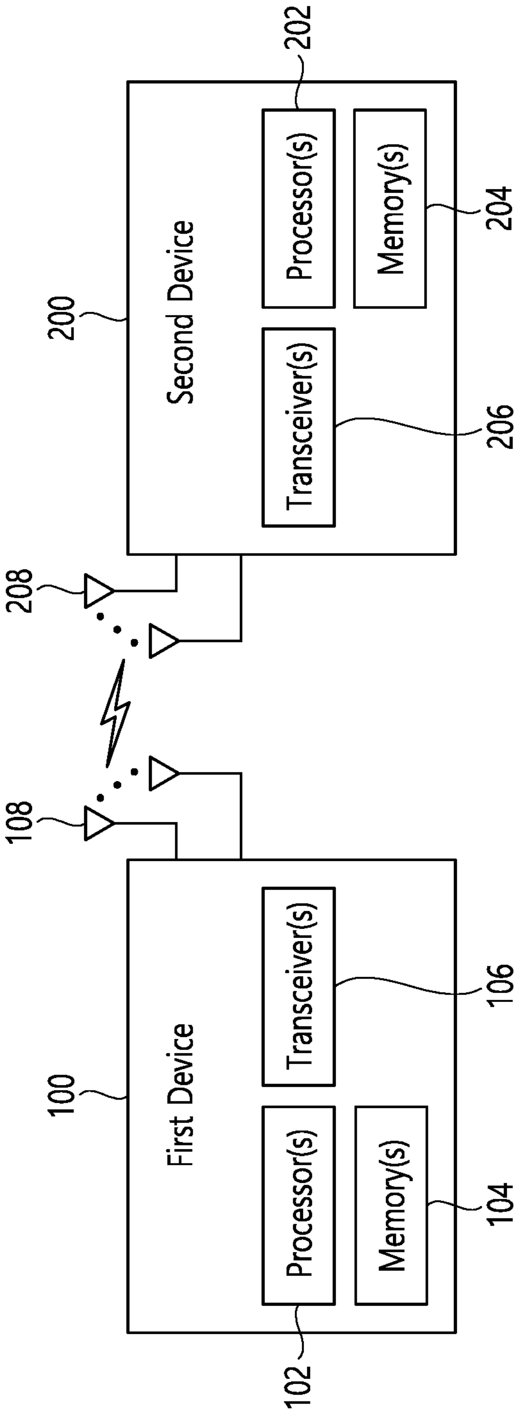
FIG. 22 shows wireless devices, based on an embodiment of the present disclosure.

FIG. 22 shows wireless devices, based on an embodiment of the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
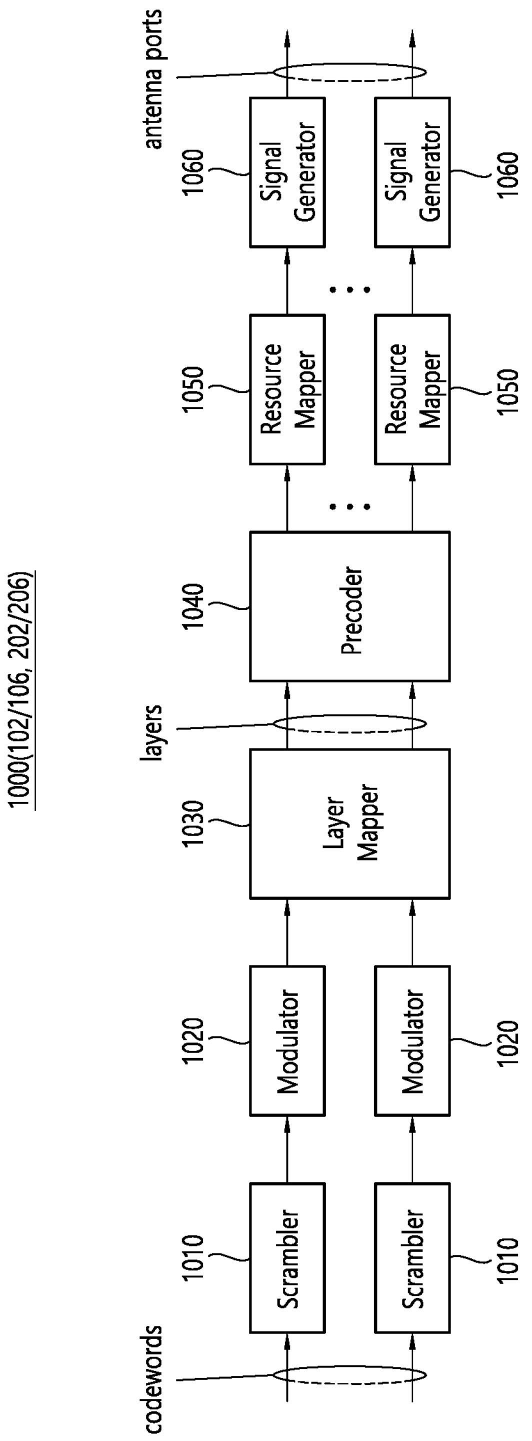
FIG. 23 shows a signal process circuit for a transmission signal, based on an embodiment of the present disclosure.

FIG. 23 shows a signal process circuit for a transmission signal, based on an embodiment of the present disclosure.

Referring to FIG. 23, a signal processing circuit 1000 may include scramblers 1010, modulators 1020, a layer mapper 1030, a precoder 1040, resource mappers 1050, and signal generators 1060. An operation/function of FIG. 23 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22. Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 23. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 24:
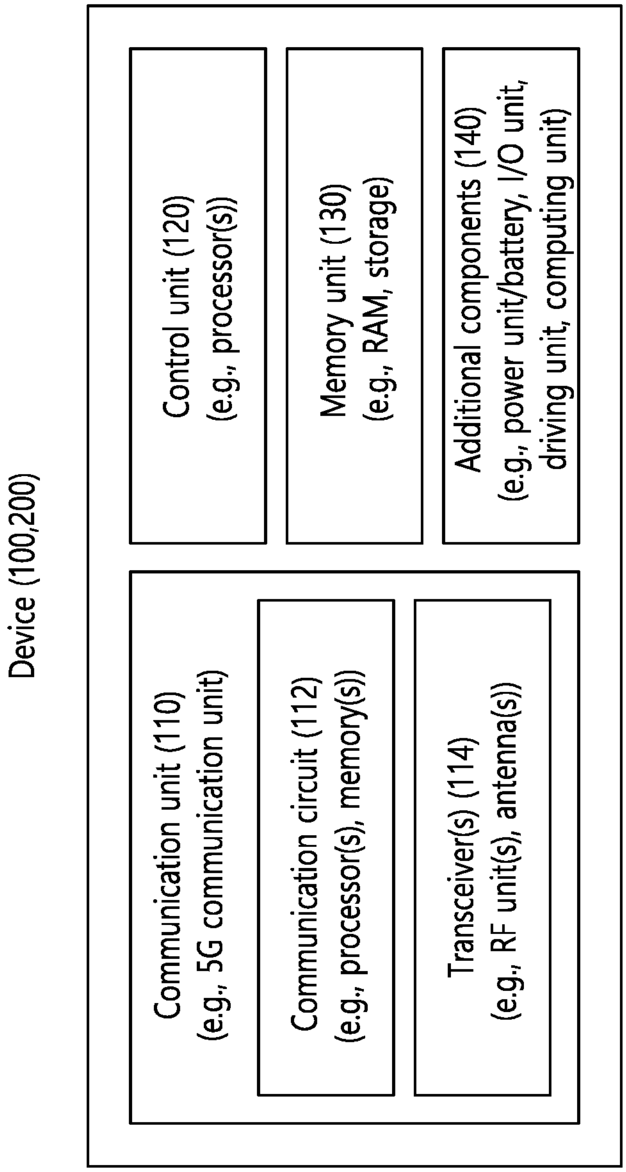
FIG. 24 shows another example of a wireless device, based on an embodiment of the present disclosure.

FIG. 24 shows another example of a wireless device, based on an embodiment of the present disclosure. The wireless device may be implemented in various forms according to a use-case/service (refer to FIG. 21).

Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 21), the vehicles (100*b*-1 and 100*b*-2 of FIG. 21), the XR device (100*c* of FIG. 21), the hand-held device (100*d* of FIG. 21), the home appliance (100*e* of FIG. 21), the IoT device (100*f* of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
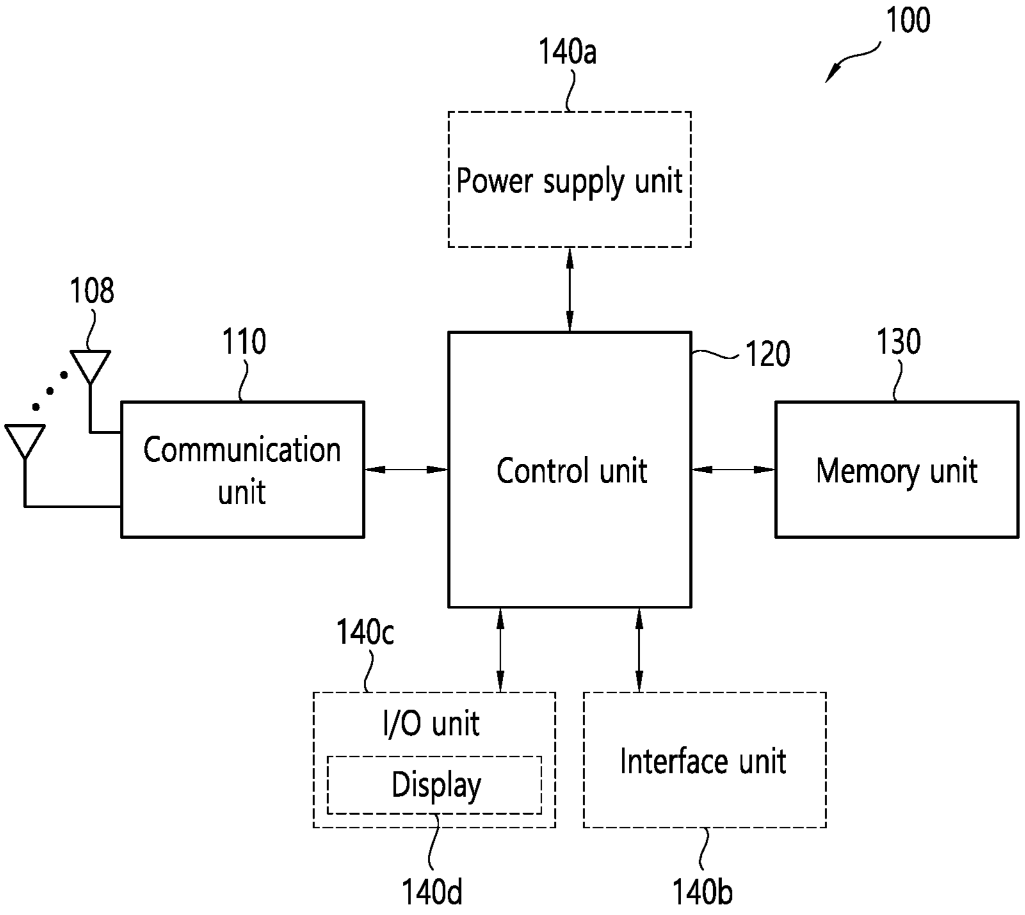
FIG. 25 shows a hand-held device, based on an embodiment of the present disclosure.

FIG. 25 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 26:
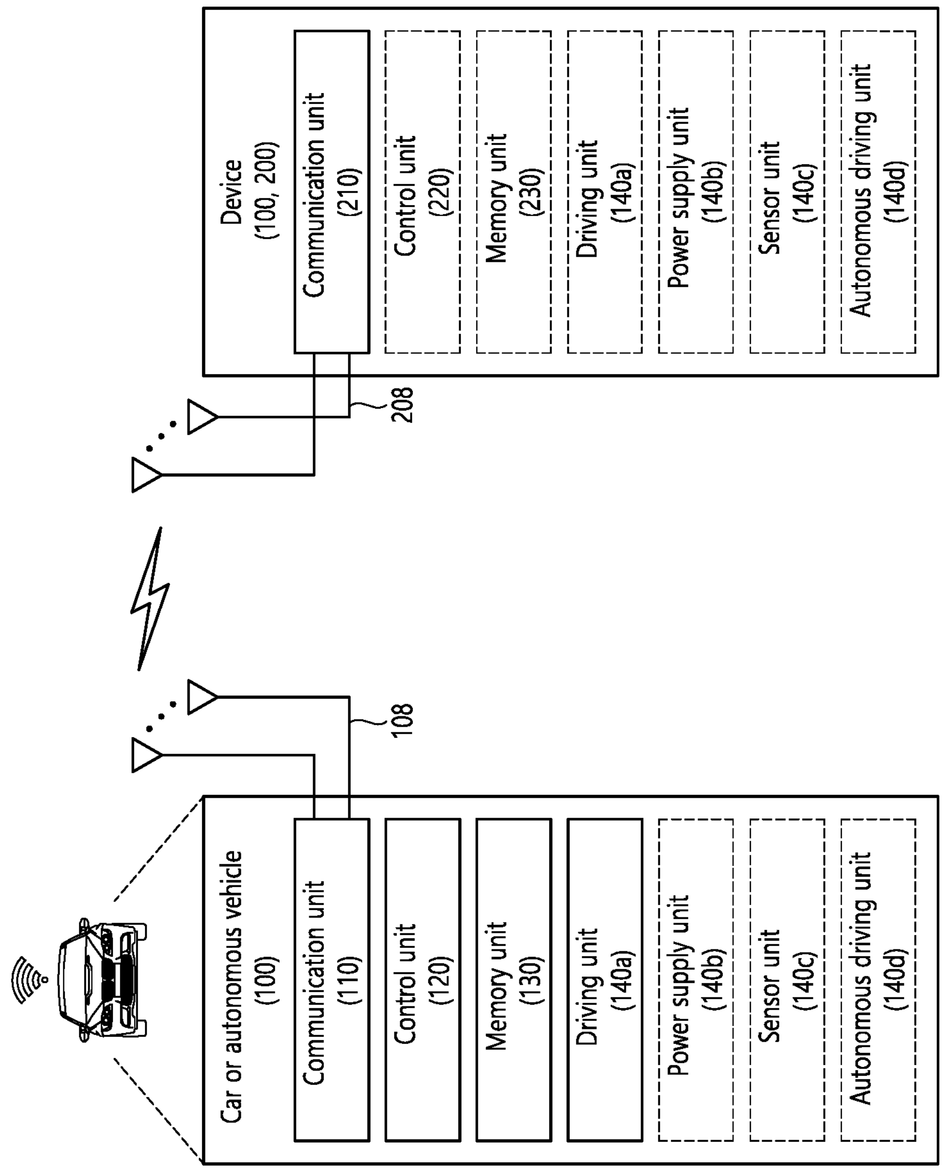
FIG. 26 shows a vehicle or an autonomous vehicle, based on an embodiment of the present disclosure.

FIG. 26 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 26, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

receiving, by a first user equipment (UE), an inter-UE physical control channel from a second UE;

receiving, by the first UE, an inter-UE physical shared channel related to the inter-UE physical control channel from the second UE;

determining, by the first UE, an inter-UE physical feedback channel resource related to the inter-UE physical shared channel, based on an index of a slot related to the inter-UE physical shared channel and an index of a subchannel related to the inter-UE physical shared channel; and transmitting, by the first UE, hybrid automatic repeat request (HARQ) feedback information for the inter-UE physical shared channel to the second UE on the inter-UE physical feedback channel resource, wherein the inter-UE physical shared channel is received on a first slot which is the Nth slot, wherein the HARQ feedback information is transmitted on a second slot which includes the inter-UE physical feedback channel resource, among the N+Kth slot and slots after the N+Kth slot, wherein the N value and the K value are zero or positive integers, wherein based on at least one of an inter-UE physical control channel resource, an inter-UE physical shared channel resource, or the inter-UE physical feedback channel resource, configured for a resource pool, a plurality of candidate K values or the range of a candidate K value are configured, wherein the K value is selected among the plurality of candidate K values or in the range of a candidate K value, and wherein a K value configured in a case in which the inter-UE physical control channel resource is included in the second half of the first slot is greater than a K value configured in a case in which the inter-UE physical control channel resource is included in the first half of the first slot.

2. The method of claim 1, wherein a K value configured in a case in which the number of symbols of the inter-UE physical control channel resource is large is greater than a K value configured in a case in which the number of symbols of the inter-UE physical control channel resource is small.

3. The method of claim 2, wherein the number of symbols of the inter-UE physical control channel resource is configured per resource pool.

4. The method of claim 1, wherein the location of the inter-UE physical control channel resource in the first slot is configured for each resource pool.

5. The method of claim 1, wherein a K value configured in a case in which the number of symbols related to a DMRS mapped on the inter-UE physical control channel resource or the inter-UE physical shared channel resource is small is greater than a K value configured in a case in which the number of symbols related to a DMRS mapped on the inter-UE physical control channel resource or the inter-UE physical shared channel resource is large.

6. The method of claim 1, wherein a K value configured in a case in which the number of symbols of the inter-UE physical feedback channel resource is large is greater than a K value configured in a case in which the number of symbols of the inter-UE physical feedback channel resource is small.

7. A first user equipment (UE) comprising:

one or more memories storing instructions;

one or more transceivers; and one or more processors connected to the one or more memories and the one or more transceivers, wherein the one or more processors execute the instructions to:

receive an inter-UE physical control channel from a second UE;

receive an inter-UE physical shared channel related to the inter-UE physical control channel from the second UE;

determine an inter-UE physical feedback channel resource related to the inter-UE physical shared channel, based on an index of a slot related to the inter-UE physical shared channel and an index of a subchannel related to the inter-UE physical shared channel; and transmit hybrid automatic repeat request (HARQ) feedback information for the inter-UE physical shared channel to the second UE on the inter-UE physical feedback channel resource, wherein the inter-UE physical shared channel is received on a first slot which is the Nth slot, wherein the HARQ feedback information is transmitted on a second slot which includes the inter-UE physical feedback channel resource, among the N+Kth slot and slots after the N+Kth slot, wherein the N value and the K value are zero or positive integers, wherein based on at least one of an inter-UE physical control channel resource, an inter-UE physical shared channel resource, or the inter-UE physical feedback channel resource, configured for a resource pool, a plurality of candidate K values or the range of a candidate K value are configured, wherein the K value is selected among the plurality of candidate K values or in the range of a candidate K value, and wherein a K value configured in a case in which the inter-UE physical control channel resource is included in the second half of the first slot is greater than a K value configured in a case in which the inter-UE physical control channel resource is included in the first half of the first slot.

8. A processing device adapted to control a first user equipment (UE), the processing device comprising:

one or more processors; and one or more memories operably connectable to the one or more processors and storing instructions, wherein the one or more processors execute the instructions to:

receive an inter-UE physical control channel from a second UE;

receive an inter-UE physical shared channel related to the inter-UE physical control channel from the second UE;

determine an inter-UE physical feedback channel resource related to the inter-UE physical shared channel, based on an index of a slot related to the inter-UE physical shared channel and an index of a subchannel related to the inter-UE physical shared channel; and transmit hybrid automatic repeat request (HARQ) feedback information for the inter-UE physical shared channel to the second UE on the inter-UE physical feedback channel resource, wherein the inter-UE physical shared channel is received on a first slot which is the Nth slot, wherein the HARQ feedback information is transmitted on a second slot which includes the inter-UE physical feedback channel resource, among the N+Kth slot and slots after the N+Kth slot, wherein the N value and the K value are zero or positive integers, wherein based on at least one of an inter-UE physical control channel resource, an inter-UE physical shared channel resource, or the inter-UE physical feedback channel resource, configured for a resource pool, a plurality of candidate K values or the range of a candidate K value are configured, wherein the K value is selected among the plurality of candidate K values or in the range of a candidate K value, and wherein a K value configured in a case in which the inter-UE physical control channel resource is included in the second half of the first slot is greater than a K value configured in a case in which the inter-UE physical control channel resource is included in the first half of the first slot.

* * * * *